(12) United States Patent
Kodama et al.

(10) Patent No.: US 9,485,388 B2
(45) Date of Patent: Nov. 1, 2016

(54) IMAGE PROCESSING APPARATUS, METHOD, AND COMPUTER STORAGE MEDIUM CONFIGURED FOR LINE CORRECTION BASED ON A NUMBER OF LINKED DOTS

(71) Applicant: CANON KABUSHIKI KAISHA, Tokyo (JP)

(72) Inventors: Shigeo Kodama, Tokyo (JP); Hisashi Ishikawa, Urayasu (JP); Go Araki, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/807,010

(22) Filed: Jul. 23, 2015

(65) Prior Publication Data
US 2016/0034798 A1 Feb. 4, 2016

(30) Foreign Application Priority Data

Aug. 1, 2014 (JP) ................................. 2014-157828

(51) Int. Cl.
| | |
|---|---|
| H04N 1/46 | (2006.01) |
| H04N 1/60 | (2006.01) |
| H04N 1/40 | (2006.01) |
| H04N 1/405 | (2006.01) |
| H04N 1/409 | (2006.01) |

(52) U.S. Cl.
CPC ............... *H04N 1/40* (2013.01); *H04N 1/405* (2013.01); *H04N 1/4092* (2013.01)

(58) Field of Classification Search
None
See application file for complete search history.

(56) References Cited

U.S. PATENT DOCUMENTS

| | | | | |
|---|---|---|---|---|
| 7,630,100 B2 * | 12/2009 | Tojima | ................... | H04N 1/506 347/232 |
| 7,948,662 B2 * | 5/2011 | Sato | ..................... | H04N 1/4076 358/448 |
| 8,059,296 B2 * | 11/2011 | Hayashi | ............. | H04N 1/32122 358/1.14 |
| 8,189,208 B2 * | 5/2012 | Yasuda | .............. | H04N 1/32101 358/1.11 |
| 8,614,825 B2 * | 12/2013 | Shoji | .................... | H04N 1/3935 358/1.2 |
| 2001/0021034 A1 * | 9/2001 | Suzuki | ............... | H04N 1/40062 358/1.9 |
| 2001/0050776 A1 * | 12/2001 | Obata | .................. | H04N 1/4092 358/1.2 |
| 2006/0187491 A1 * | 8/2006 | Sakai | ................. | H04N 1/40062 358/3.27 |
| 2006/0228035 A1 * | 10/2006 | Ishikawa | .................. | H04N 1/52 382/252 |
| 2006/0232800 A1 * | 10/2006 | Otake | ................ | H04N 1/40062 358/1.9 |
| 2009/0009782 A1 * | 1/2009 | Arakawa | ............ | H04N 1/00856 358/1.9 |

(Continued)

FOREIGN PATENT DOCUMENTS

| | | |
|---|---|---|
| JP | H11028839 A | 2/1999 |
| JP | 2007-272153 A | 10/2007 |

*Primary Examiner* — Madelein Nguyen
(74) *Attorney, Agent, or Firm* — Carter, DeLuca, Farrell & Schmidt, LLP

(57) ABSTRACT

An apparatus that corrects multivalued data after halftone processing and which includes a line input unit configured to input multivalued data of a correction line to be corrected among the multivalued data, a detection unit configured to convert multivalued data of a precedent line that precedes the correction line by N lines into dot data and to detect a dot in the precedent line, and a line correction unit configured to correct the multivalued data of the correction line based on a number of linked dots from the bottom-end edge, and the number of linked detected dots is the number of dots that are linked in a sub scanning direction from the correction line down to the bottom-end edge, and the bottom-end edge is an edge at which the density becomes lower in the sub scanning direction and the lower of density values represents the background color.

19 Claims, 25 Drawing Sheets

(56) References Cited

U.S. PATENT DOCUMENTS

2009/0214238 A1* 8/2009 Tanaka ............... H04N 1/40037
　　　　　　　　　　　　　　　　　　　　　399/51

2011/0116112 A1* 5/2011 Muramatsu ........... G06T 3/4053
　　　　　　　　　　　　　　　　　　　　　358/1.9

2013/0293928 A1* 11/2013 Kashibuchi ........ G06K 15/1881
　　　　　　　　　　　　　　　　　　　　　358/3.06

* cited by examiner

| | C0 | C1 | C2 | C3 | C4 | C5 | C6 | C7 | C8 | C9 | C10 | C11 | C12 | C13 | C14 | C15 |
|---|---|---|---|---|---|---|---|---|---|---|---|---|---|---|---|---|
| L5 | 0 | 0 | 0 | 0 | 0 | 1 | 1 | 1 | 1 | 1 | 1 | 0 | 0 | 0 | 0 | 0 |
| L6 | 0 | 0 | 0 | 0 | 0 | 1 | 1 | 0 | 1 | 1 | 1 | 1 | 0 | 0 | 0 | 0 |
| L7 | 0 | 0 | 0 | 0 | 1 | 1 | 1 | 0 | 0 | 1 | 1 | 1 | 0 | 0 | 0 | 0 |
| L8 | 0 | 0 | 0 | 0 | 1 | 1 | 1 | 1 | 1 | 1 | 1 | 1 | 0 | 0 | 0 | 0 |
| L9 | 0 | 0 | 0 | 1 | 1 | 1 | 1 | 1 | 1 | 1 | 1 | 1 | 0 | 0 | 0 | 0 |

| INPUT MULTIVALUED DATA | NUMBER OF LINKED DOTS | CORRECTED MULTIVALUED DATA |
|---|---|---|
| 15 | 5 | 14 |
| | 4 | 14 |
| | 3 | 13 |
| | 2 | 13 |
| | 1 | 12 |
| 14 | 5 | 14 |
| | 4 | 13 |
| | 3 | 13 |
| | 2 | 13 |
| | 1 | 12 |
| 13 | 5 | 13 |
| | 4 | 13 |
| | 3 | 12 |
| | 2 | 12 |
| | 1 | 12 |

FIG. 13A NUMBER OF LINKED DOTS

|     | C0 | C1 | C2 | C3 | C4 | C5 | C6 | C7 | C8 | C9 | C10 | C11 | C12 | C13 | C14 | C15 |
|-----|----|----|----|----|----|----|----|----|----|----|-----|-----|-----|-----|-----|-----|
| L0  | 0  | 0  | 0  | 0  | 0  | 0  | 0  | 0  | 0  | 0  | 0   | 0   | 0   | 0   | 0   | 0   |
| L1  | 0  | 0  | 0  | 0  | 0  | 0  | 0  | 5  | 6  | 0  | 0   | 0   | 0   | 0   | 0   | 0   |
| L2  | 0  | 0  | 0  | 0  | 0  | 0  | 0  | 4  | 5  | 6  | 0   | 0   | 0   | 0   | 0   | 0   |
| L3  | 0  | 0  | 0  | 0  | 0  | 0  | 6  | 3  | 4  | 6  | 0   | 0   | 0   | 0   | 0   | 0   |
| L4  | 0  | 0  | 0  | 0  | 0  | 6  | 6  | 2  | 3  | 6  | 6   | 0   | 0   | 0   | 0   | 0   |
| L5  | 0  | 0  | 0  | 0  | 0  | 6  | 6  | 1  | 2  | 6  | 6   | 0   | 0   | 0   | 0   | 0   |
| L6  | 0  | 0  | 0  | 0  | 0  | 5  | 5  | 0  | 1  | 5  | 6   | 6   | 0   | 0   | 0   | 0   |
| L7  | 0  | 0  | 0  | 0  | 6  | 4  | 4  | 0  | 0  | 4  | 6   | 6   | 0   | 0   | 0   | 0   |
| L8  | 0  | 0  | 0  | 0  | 6  | 3  | 3  | 3  | 3  | 3  | 6   | 6   | 6   | 0   | 0   | 0   |
| L9  | 0  | 0  | 0  | 6  | 6  | 2  | 2  | 2  | 2  | 2  | 6   | 6   | 6   | 0   | 0   | 0   |
| L10 | 0  | 0  | 0  | 6  | 6  | 1  | 1  | 1  | 1  | 1  | 6   | 6   | 6   | 0   | 0   | 0   |
| L11 | 0  | 0  | 0  | 5  | 5  | 0  | 0  | 0  | 0  | 0  | 5   | 5   | 5   | 5   | 0   | 0   |
| L12 | 0  | 4  | 4  | 4  | 4  | 4  | 0  | 0  | 0  | 0  | 4   | 4   | 4   | 4   | 4   | 0   |
| L13 | 2  | 3  | 3  | 3  | 3  | 3  | 2  | 0  | 0  | 2  | 3   | 3   | 3   | 3   | 3   | 2   |
| L14 | 1  | 2  | 2  | 2  | 2  | 2  | 1  | 0  | 0  | 1  | 2   | 2   | 2   | 2   | 2   | 1   |
| L15 | 0  | 1  | 1  | 1  | 1  | 1  | 0  | 0  | 0  | 0  | 1   | 1   | 1   | 1   | 1   | 0   |

FIG. 13B DOT LINK WIDTH

|     | C0 | C1 | C2 | C3 | C4 | C5 | C6 | C7 | C8 | C9 | C10 | C11 | C12 | C13 | C14 | C15 |
|-----|----|----|----|----|----|----|----|----|----|----|-----|-----|-----|-----|-----|-----|
| L0  | 0  | 0  | 0  | 0  | 0  | 0  | 0  | 0  | 0  | 0  | 0   | 0   | 0   | 0   | 0   | 0   |
| L1  | 0  | 0  | 0  | 0  | 0  | 0  | 0  | 5  | 6  | 0  | 0   | 0   | 0   | 0   | 0   | 0   |
| L2  | 0  | 0  | 0  | 0  | 0  | 0  | 0  | 5  | 6  | 6  | 0   | 0   | 0   | 0   | 0   | 0   |
| L3  | 0  | 0  | 0  | 0  | 0  | 0  | 6  | 5  | 6  | 6  | 0   | 0   | 0   | 0   | 0   | 0   |
| L4  | 0  | 0  | 0  | 0  | 0  | 6  | 6  | 5  | 6  | 6  | 6   | 0   | 0   | 0   | 0   | 0   |
| L5  | 0  | 0  | 0  | 0  | 0  | 6  | 6  | 5  | 6  | 6  | 6   | 0   | 0   | 0   | 0   | 0   |
| L6  | 0  | 0  | 0  | 0  | 0  | 6  | 6  | 0  | 6  | 6  | 6   | 6   | 0   | 0   | 0   | 0   |
| L7  | 0  | 0  | 0  | 0  | 6  | 6  | 6  | 0  | 0  | 6  | 6   | 6   | 0   | 0   | 0   | 0   |
| L8  | 0  | 0  | 0  | 0  | 6  | 6  | 6  | 3  | 3  | 6  | 6   | 6   | 6   | 0   | 0   | 0   |
| L9  | 0  | 0  | 0  | 6  | 6  | 6  | 6  | 3  | 3  | 6  | 6   | 6   | 6   | 0   | 0   | 0   |
| L10 | 0  | 0  | 0  | 6  | 6  | 6  | 6  | 3  | 3  | 6  | 6   | 6   | 6   | 0   | 0   | 0   |
| L11 | 0  | 0  | 0  | 6  | 6  | 0  | 0  | 0  | 0  | 0  | 6   | 6   | 6   | 5   | 0   | 0   |
| L12 | 0  | 4  | 4  | 6  | 6  | 4  | 0  | 0  | 0  | 0  | 6   | 6   | 6   | 5   | 4   | 0   |
| L13 | 2  | 4  | 4  | 6  | 6  | 4  | 2  | 0  | 0  | 2  | 6   | 6   | 6   | 5   | 4   | 2   |
| L14 | 2  | 4  | 4  | 6  | 6  | 4  | 2  | 0  | 0  | 2  | 6   | 6   | 6   | 5   | 4   | 2   |
| L15 | 0  | 4  | 4  | 6  | 6  | 4  | 0  | 0  | 0  | 0  | 6   | 6   | 6   | 5   | 4   | 0   |

| INPUT MULTIVALUED DATA | DOT LINK WIDTH | NUMBER OF LINKED DOTS | CORRECTED MULTIVALUED DATA |
|---|---|---|---|
| 15 | 6 | 5 | 14 |
| | | 4 | 14 |
| | | 3 | 13 |
| | | 2 | 13 |
| | | 1 | 12 |
| | 5 | 5 | 14 |
| | | 4 | 14 |
| | | 3 | 13 |
| | | 2 | 13 |
| | | 1 | 12 |
| | 4 | 4 | 15 |
| | | 3 | 14 |
| | | 2 | 14 |
| | | 1 | 14 |

|     | C0 | C1 | C2 | C3 | C4 | C5 | C6 | C7 | C8 | C9 | C10 | C11 | C12 | C13 | C14 | C15 |
|-----|----|----|----|----|----|----|----|----|----|----|-----|-----|-----|-----|-----|-----|
| L0  | 0  | 0  | 0  | 0  | 0  | 2  | 3  | 5  | 5  | 4  | 2   | 0   | 0   | 0   | 0   | 0   |
| L1  | 0  | 0  | 0  | 0  | 0  | 3  | 4  | 5  | 6  | 5  | 3   | 1   | 0   | 0   | 0   | 0   |
| L2  | 0  | 0  | 0  | 0  | 1  | 4  | 5  | 4  | 5  | 6  | 4   | 2   | 0   | 0   | 0   | 0   |
| L3  | 0  | 0  | 0  | 0  | 2  | 5  | 6  | 4  | 4  | 6  | 5   | 3   | 1   | 0   | 0   | 0   |
| L4  | 0  | 0  | 0  | 1  | 3  | 6  | 6  | 4  | 4  | 6  | 6   | 4   | 2   | 0   | 0   | 0   |
| L5  | 0  | 0  | 0  | 2  | 4  | 6  | 6  | 4  | 4  | 6  | 6   | 5   | 3   | 0   | 0   | 0   |
| L6  | 0  | 0  | 0  | 3  | 5  | 5  | 5  | 3  | 4  | 5  | 6   | 6   | 4   | 1   | 0   | 0   |
| L7  | 0  | 1  | 1  | 4  | 6  | 5  | 4  | 3  | 3  | 4  | 6   | 6   | 5   | 2   | 1   | 0   |
| L8  | 1  | 2  | 2  | 5  | 6  | 5  | 3  | 3  | 3  | 3  | 6   | 6   | 6   | 3   | 2   | 1   |
| L9  | 2  | 3  | 3  | 6  | 6  | 5  | 3  | 2  | 2  | 3  | 6   | 6   | 6   | 4   | 3   | 2   |
| L10 | 2  | 4  | 4  | 6  | 6  | 5  | 3  | 1  | 1  | 3  | 6   | 6   | 6   | 5   | 4   | 2   |
| L11 | 2  | 4  | 4  | 5  | 5  | 4  | 2  | 0  | 0  | 2  | 5   | 5   | 5   | 5   | 4   | 2   |
| L12 | 2  | 4  | 4  | 4  | 4  | 4  | 2  | 0  | 0  | 2  | 4   | 4   | 4   | 4   | 4   | 2   |
| L13 | 2  | 3  | 3  | 3  | 3  | 3  | 2  | 0  | 0  | 2  | 3   | 3   | 3   | 3   | 3   | 2   |
| L14 | 1  | 2  | 2  | 2  | 2  | 2  | 1  | 0  | 0  | 1  | 2   | 2   | 2   | 2   | 2   | 1   |
| L15 | 0  | 1  | 1  | 1  | 1  | 1  | 0  | 0  | 0  | 0  | 1   | 1   | 1   | 1   | 1   | 0   |

FIG.20

|    | C0 | C1 | C2 | C3 | C4 | C5 | C6 | C7 | C8 | C9 | C10 | C11 | C12 | C13 | C14 | C15 |
|----|----|----|----|----|----|----|----|----|----|----|-----|-----|-----|-----|-----|-----|
| L0 | 0 | 0 | 0 | 0 | 0 | 2 | 3 | 5 | 5 | 4 | 2 | 0 | 0 | 0 | 0 | 0 |
| L1 | 0 | 0 | 0 | 0 | 0 | 3 | 4 | 5 | 6 | 5 | 3 | 1 | 0 | 0 | 0 | 0 |
| L2 | 0 | 0 | 0 | 0 | 1 | 4 | 5 | 4 | 5 | 6 | 4 | 2 | 0 | 0 | 0 | 0 |
| L3 | 0 | 0 | 0 | 0 | 2 | 5 | 6 | 4 | 4 | 6 | 5 | 3 | 1 | 0 | 0 | 0 |
| L4 | 0 | 0 | 0 | 1 | 3 | 6 | 6 | 4 | 4 | 6 | 6 | 4 | 2 | 0 | 0 | 0 |
| L5 | 0 | 0 | 0 | 2 | 4 | 6 | 6 | 4 | 4 | 6 | 6 | 5 | 3 | 0 | 0 | 0 |
| L6 | 0 | 0 | 0 | 3 | 5 | 5 | 5 | 0 | 4 | 5 | 6 | 6 | 4 | 1 | 0 | 0 |
| L7 | 0 | 1 | 1 | 4 | 6 | 5 | 4 | 0 | 0 | 4 | 6 | 6 | 5 | 2 | 1 | 0 |
| L8 | 1 | 2 | 2 | 5 | 6 | 5 | 3 | 0 | 0 | 3 | 6 | 6 | 6 | 3 | 2 | 1 |
| L9 | 2 | 3 | 3 | 6 | 6 | 5 | 3 | 0 | 0 | 3 | 6 | 6 | 6 | 4 | 3 | 2 |
| L10 | 0 | 4 | 4 | 6 | 6 | 5 | 3 | 0 | 0 | 3 | 6 | 6 | 6 | 5 | 4 | 0 |
| L11 | 0 | 4 | 4 | 5 | 5 | 4 | 0 | 0 | 0 | 0 | 5 | 5 | 5 | 5 | 4 | 0 |
| L12 | 0 | 4 | 4 | 4 | 4 | 4 | 0 | 0 | 0 | 0 | 4 | 4 | 4 | 4 | 4 | 0 |
| L13 | 0 | 3 | 3 | 3 | 3 | 3 | 0 | 0 | 0 | 0 | 3 | 3 | 3 | 3 | 3 | 0 |
| L14 | 0 | 2 | 2 | 2 | 2 | 2 | 0 | 0 | 0 | 0 | 2 | 2 | 2 | 2 | 2 | 0 |
| L15 | 0 | 1 | 1 | 1 | 1 | 1 | 0 | 0 | 0 | 0 | 1 | 1 | 1 | 1 | 1 | 0 |

FIG.25

IMAGE PROCESSING APPARATUS, METHOD, AND COMPUTER STORAGE MEDIUM CONFIGURED FOR LINE CORRECTION BASED ON A NUMBER OF LINKED DOTS

BACKGROUND OF THE INVENTION

1. Field of the Invention

The present invention relates to a technique to correct fluctuations in density that occur on the periphery of an edge of multivalued data obtained by performing halftone processing on digital image data.

2. Description of the Related Art

In the case where digital image data each color of which is represented by 8 bits or 16 bits is printed, halftone processing to convert the digital image data into multivalued data having the number of tone levels that the printer can print is performed while representing the original gradation in a pseudo manner. In the case where the printer is a laser beam printer that forms an image by using an electrophotographic process, the time during which laser light is emitted in the exposure process is determined by performing PWM control in accordance with the multivalued data on which the halftone processing has been performed.

In the case where an image is formed by using the electrophotographic process, it is known that fluctuations in density occur on the periphery of the edge of the image due to a phenomenon (called an edge effect) in which the magnetic toner is developed in the state of being concentrated at the edge portion of a character or the like because electric fields concentrate on the edge of an electrostatic latent image located on the photoconductor. The degree in which the edge effect appears differs also depending on the characteristics of each process forming the electrophotographic process, in addition to the image factors, such as the direction, length, and density, of the edge. In particular, the edge effect will be remarkable on the periphery of an edge at which the density becomes lower in the sub scanning direction and the lower of density values represents the background color (hereinafter, called a bottom-end edge).

In order to deal with such a phenomenon, in Japanese Patent Laid-Open No. 2007-272153, a technique has been proposed that performs an arithmetic operation on the value of the pixel of interest on image data based on the value of a pixel located on the downstream side in the sub scanning direction of the pixel of interest, and corrects the image data in accordance with the arithmetic operation results.

Further, in Japanese Patent Laid-Open No. H11-028839 (1999), a technique has been proposed, in which an edge pixel that changes in the sub scanning direction is extracted, the position and pixel value of the edge pixel on the printing medium are determined, and correction is performed by dividing the values of pixels having intermediate pixel values of the input image data into a first area far from the edge pixel and a second area on the edge pixel side.

In Japanese Patent Laid-Open No. 2007-272153 described above, the image data is temporarily held in the image memory from an external storage device, the arithmetic operation is performed on the data value of the original image data within the image memory and the data value of virtual image data that has been translated in the sub scanning direction, and the image data is corrected in accordance with the arithmetic operation results. In the case of this technique, it is necessary to hold the image data to be printed and output at least by an amount corresponding to the number of lines of translation in the image memory, and therefore, the increase in the cost resulting from the correction processing is not small.

Further, in Japanese Patent Laid-Open No. H11-028839 (1999), the edge pixel (pixel whose pixel value changes from the intermediate pixel value into the background pixel value in the sub scanning direction) is extracted and in order to determine the position of the bottom-end edge and the number of intermediate pixel values down to the bottom-end edge, the pixel values are input in the sub scanning direction. Because of this, it is necessary to perform pre-processing to change the pixel data columns arranged in the main scanning direction into those arranged in the sub scanning direction by performing 90° C. rotation after generating print data corresponding to one page, or to generate data rotated by 90° C. at the time of generating print data corresponding to one page. However, it is necessary to rotate the data by 90° C. before outputting the data to the print engine. In either case, a buffer for 90° C. rotation is necessary, and therefore, the cost will be pushed up considerably as a result.

SUMMARY OF THE INVENTION

An image processing apparatus according to the present invention is an image processing apparatus that corrects multivalued data on which halftone processing has been performed, and includes a line input unit configured to input multivalued data of a correction line to be corrected among the multivalued data and a line correction unit configured to correct the multivalued data of the correction line based on the number of linked dots from a bottom-end edge, wherein the number of linked dots is the number of detected dots that are lined from the correction line down to the bottom-end edge in a sub scanning direction and the bottom-end edge is an edge at which the density becomes lower in the sub scanning direction and the lower of density values represents the background color.

Further features of the present invention will become apparent from the following description of exemplary embodiments (with reference to the attached drawings).

BRIEF DESCRIPTION OF THE DRAWINGS

FIG. 7 is a diagram showing an example of dot data that is held in a line memory;

FIG. 8 is a diagram showing an example of the number of linked dots;

FIG. 9 is a diagram showing an example of a correction table according to the first embodiment;

FIG. 11 is a diagram showing image data (multivalued data) after correction, which is obtained by applying the first embodiment;

FIG. 13A is a diagram explaining a method for deriving and holding the number of linked dots;

FIG. 13B is a diagram explaining a method for deriving and holding a dot link width;

FIG. 15 is a diagram showing an example of a correction table according to the second embodiment;

FIG. 16 is a diagram showing image data (multivalued data) after correction, which is obtained by applying the second embodiment;

FIG. 20 is a diagram showing the number of linked dots, which is obtained by the count processing using a counter;

FIG. 25 is a diagram showing the number of linked dots, which is obtained in the fifth embodiment.

DESCRIPTION OF THE EMBODIMENTS

Hereinafter, embodiments for embodying the present invention are explained by using the drawings. Configurations of the embodiments shown below are merely exemplary and the present invention is not limited to the configurations shown schematically.

[First Embodiment]

In the present embodiment, an aspect is explained in which the number of linked dots from a bottom-end edge is derived and image data that is input is corrected in accordance with the distance from the bottom-end edge.

Figure 1:
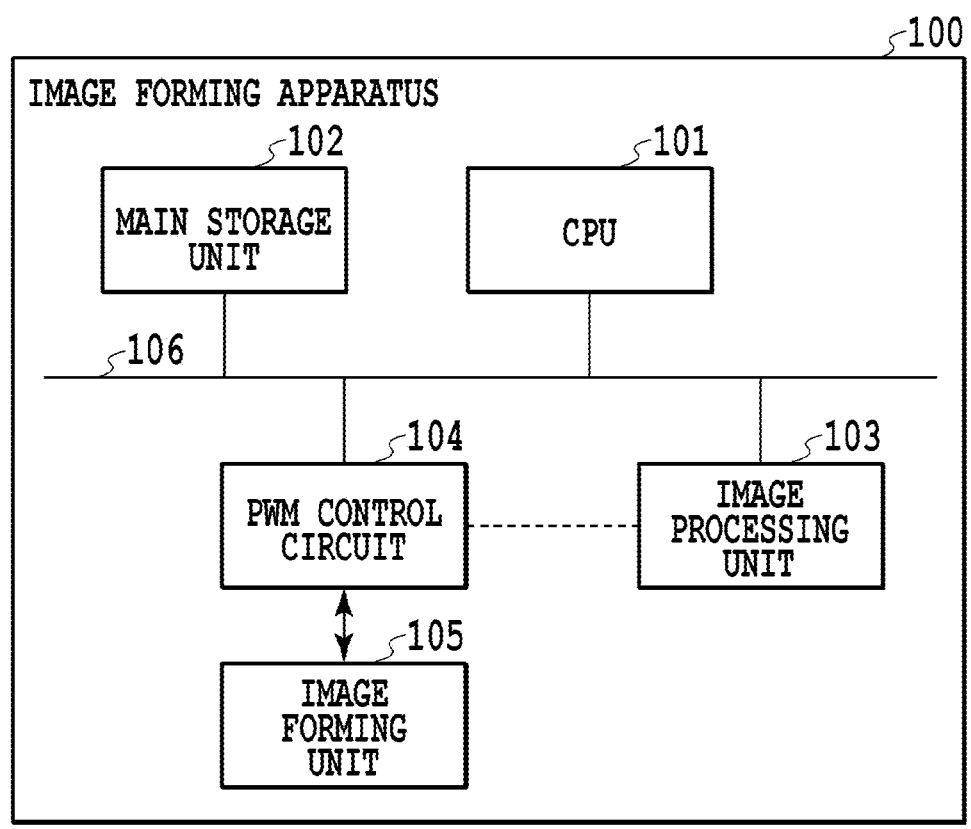
FIG. 1 is a diagram showing an outline configuration of an image forming apparatus adopting an electrophotographic scheme.

FIG. 1 is a diagram showing an outline configuration of an image forming apparatus adopting an electrophotographic scheme according to the present embodiment. In FIG. 1, an image forming apparatus 100 includes a CPU 101, a main storage unit 102, an image processing unit 103, a PWM control circuit 104, an image forming unit 105, and a bus 106.

The image forming apparatus 100 is controlled by the CPU 101. The CPU 101 reads input image data after halftone processing that is stored in the main storage unit 102, such as an HDD, onto the image processing unit 103 and performs correction processing. The image data on which the correction processing has been performed is stored in the main storage unit 102 again. Alternatively, the image data after the correction processing is output directly to the PWM control circuit 104 as indicated by the broken line.

The PWM control circuit 104 performs PWM control of laser light emission in the image forming unit 105 in accordance with image data that is input from the main storage unit 102 or the image processing unit 103.

The image forming unit 105 scans the photoconductor with laser light in accordance with the control signal from the PWM control circuit 104 to form a latent image on the photoconductor, applies toner as color materials, fixes the toner to a printing medium, and thus develops an image.

The bus 106 connects each of the units described above to one another.

Figure 2:
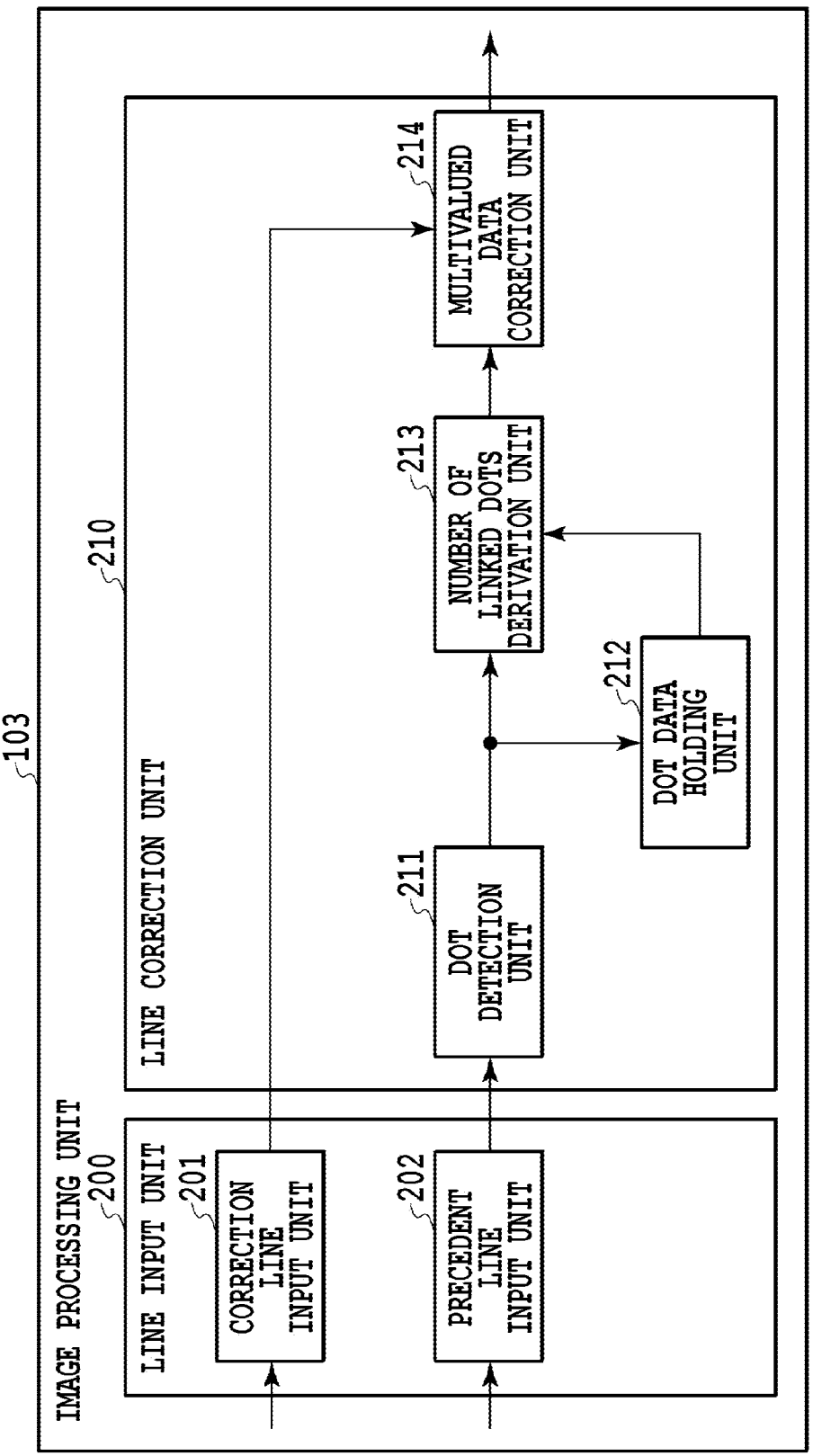
FIG. 2 is a block diagram showing an internal configuration of an image processing unit according to a first embodiment.

Next, the image processing unit 103 is explained in detail. FIG. 2 is a block diagram showing an internal configuration of the image processing unit 103 according to the present embodiment.

The image processing unit 103 includes a line input unit 200 and a line correction unit 210. First, the line input unit 200 is explained.

The line input unit 200 acquires multivalued image data of a target line (correction line) whose data value is to be corrected and multivalued image data of a precedent line that precedes the correction line by N (N: natural number) lines and in which dots are detected from among multivalued image data (hereinafter, multivalued data) on which halftone processing has been performed, and inputs them to the line correction unit 210. As a configuration for that, the line input unit 200 includes a correction line input unit 201 and a precedent line input unit 202. The line input unit 200 may have a configuration having a DMA (Direct Memory Access) function and in which multivalued data is received by autonomously making a read request to the main storage unit 102 or a configuration in which multivalued data that is read in response to a request from the CPU 101 is received. Further, it may also be possible to receive multivalued data by using physically different paths for the correction line and the precedent line or to chronologically acquire multivalued data by using the physically same path.

Next, the line correction unit 210 is explained.

The line correction unit 210 generates dot data from the precedent line of the multivalued data that is input from the line input unit 200, derives the above-described number of linked dots by using the dot data, and performs a correction in accordance with the distance from the bottom-end edge up to the correction line. Here, the number of linked dots is defined as information indicating how many dots (pixels having a pixel value equal to or greater than a predetermined threshold value) are linked in the sub scanning direction from the correction line down to the bottom-end edge. Then, based on the derived number of linked dots, the multivalued data of the correction line is corrected. As a configuration for that, the line correction unit 210 includes a dot detection unit 211, a dot data holding unit 212, a number of linked dots derivation unit 213, and a multivalued data correction unit 214. The information that is necessary to derive the number of linked dots from the bottom-end edge up to the correction line is not the multivalued data itself from the precedent line up to the correction line, but only the dot data or the information originating from the dot data. Consequently, the multivalued data of the precedent line that precedes is converted into the dot data immediately, and thus, the amount of information is reduced. Due to this, it is possible to reduce the storage capacity for holding information. On the other hand, the multivalued data to be corrected is the multivalued data itself of the correction line, and therefore, it is not necessary to hold it. In other words, it is made possible to perform correction processing in accordance with the distance from the bottom-end edge up to the correction line while reducing the storage capacity by inputting the multivalued data of the correction line and the precedent line that precedes the correction line.

Figure 3:
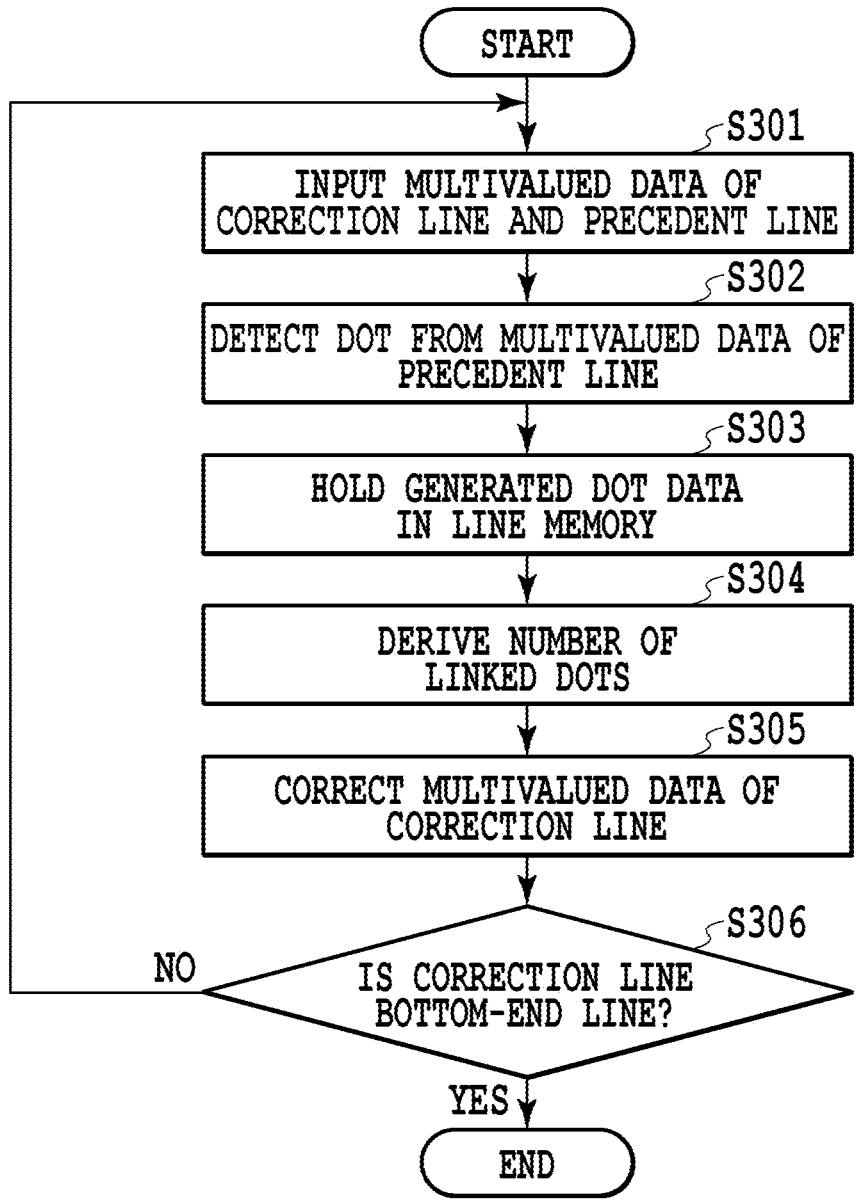
FIG. 3 is a flowchart showing a flow of image data correction processing in the image processing unit according to the first embodiment.

FIG. 3 is a flowchart showing a flow of image data correction processing in the image processing unit 103 according to the present embodiment. This processing is performed by the CPU 101 executing computer executable programs in which the procedures shown below are described after reading the programs onto the RAM, not shown.

Figure 4:
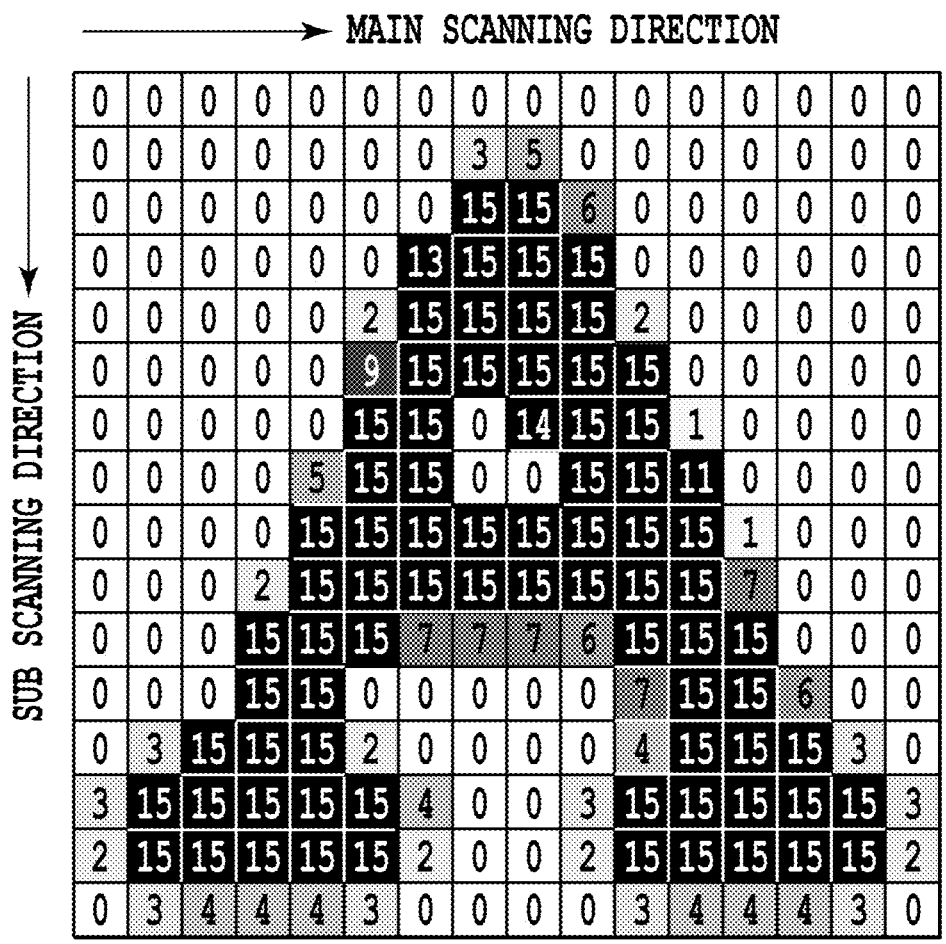
FIG. 4 is a diagram showing an example of image data after halftone processing.

At step 301, the line input unit 200 acquires the multivalued data of the correction line and the precedent line from among the multivalued data after halftone processing. Specifically, to the correction line input unit 201, the multivalued data of a line to be corrected among the multivalued data on which halftone processing has been performed is input from the main storage unit 102. Further, to the precedent line input unit 202, the multivalued data of the precedent line among the multivalued data on which halftone processing has been performed is input from the main storage unit 102. In the present embodiment, it is assumed that the multivalued data of 16 values (0 to 15) as shown in FIG. 4 is stored as image data after halftone processing.

In order to perform the "correction in accordance with the distance from the bottom-end edge" to suppress the edge effect, a precedent line amount N of the precedent line that precedes the correction line needs to be equal or greater than the "maximum distance from the bottom-end edge that is necessary to suppress the edge effect". Here, explanation is given by assuming that the precedent line amount N is "5" on the premise that at least five lines from the bottom-end edge are necessary to suppress the edge effect.

Figure 5:
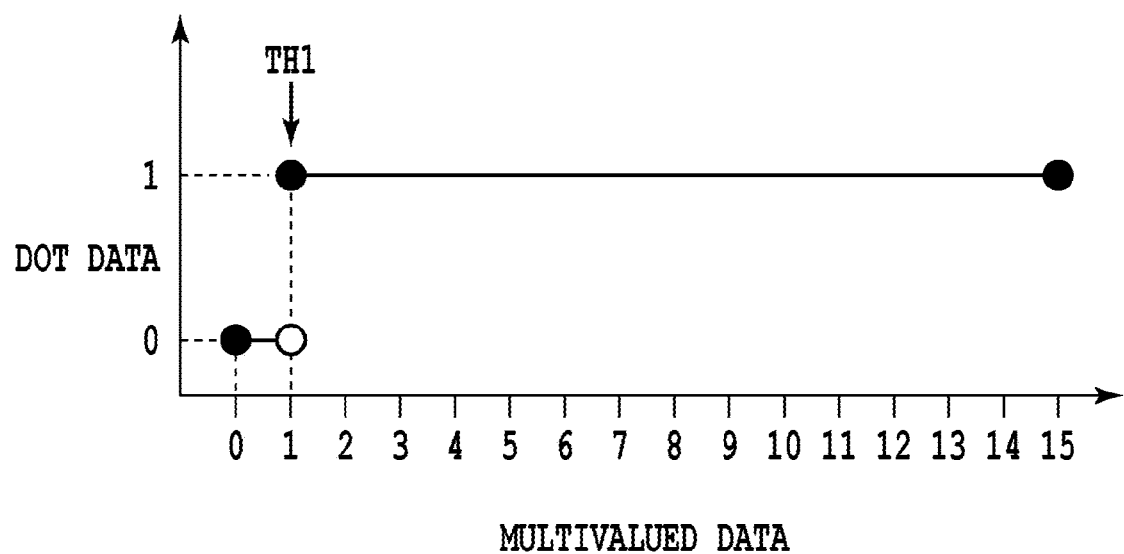
FIG. 5 is a diagram explaining conversion from multivalued data into dot data.
Figure 6:
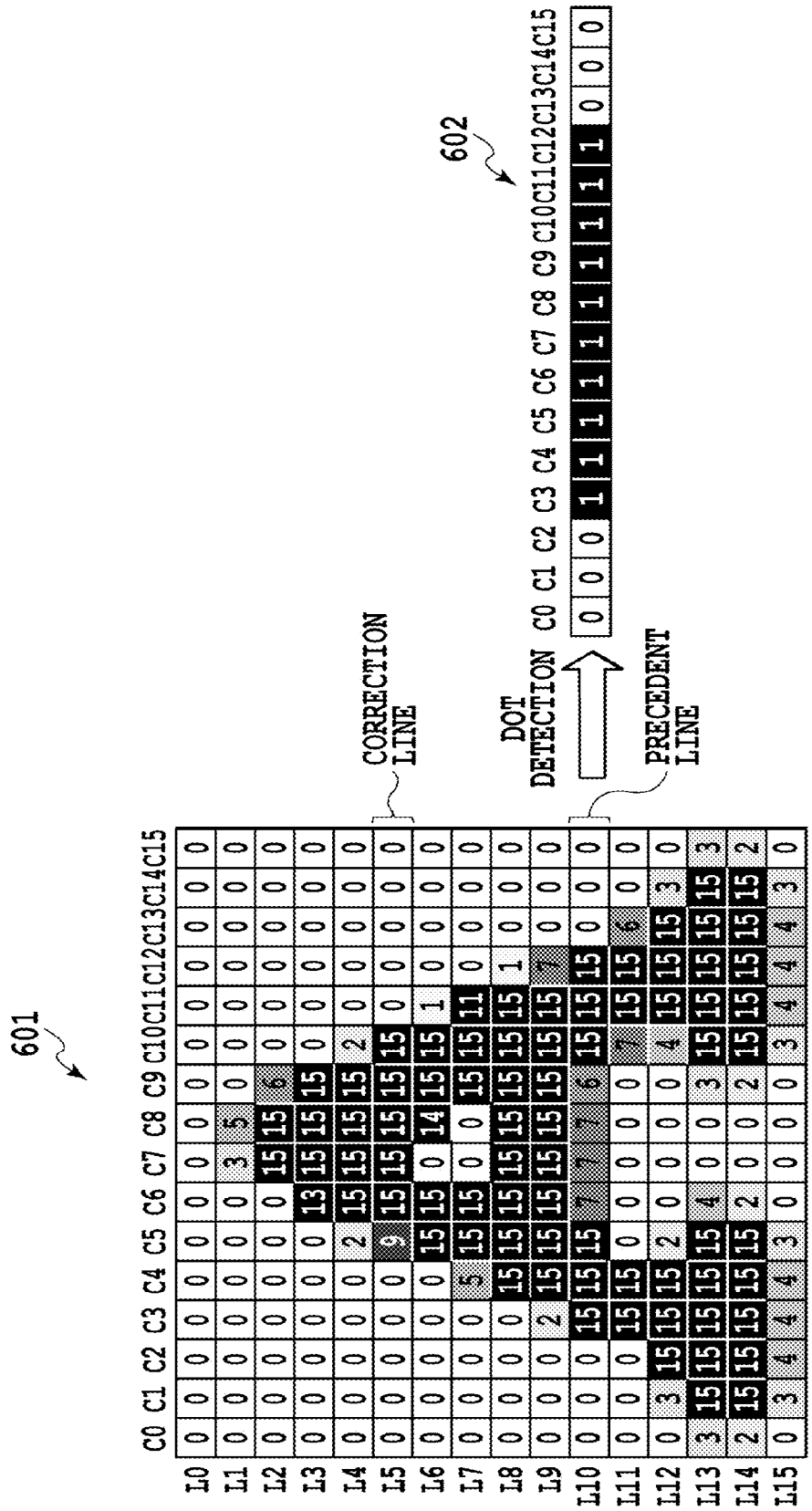
FIG. 6 is a diagram showing an example of dot detection.

At step 302, the dot detection unit 211 detects dots from the multivalued data of the precedent line and converts the multivalued data into dot data with a small number of bits (here, one bit). FIG. 5 is a diagram explaining the conversion from multivalued data into dot data. As shown in FIG. 5, the value of the multivalued data is compared with a threshold value [TH1] (here, "1") and in the case where the value of the multivalued data is less than the threshold value [TH1], "0" is output as dot data (detection results) and in the case where the value of the multivalued data is equal to or greater than the threshold value [TH1], "1" is output. By the corrected multivalued data, the laser light emission time of the image forming unit 105 is determined through the PWM control circuit 104, but whether tone fixes to the pixel to which laser light has been emitted and a dot is formed is determined depending on the characteristics of each process of the electrophotographic process. Consequently, it is preferable to appropriately set the above-described threshold value [TH1] in accordance with the characteristics of the electrophotographic process of the image forming unit 105. FIG. 6 is a diagram showing an example of specific dot detection by taking the case of the image data shown in FIG. 4 described previously as an example. Image data 601 is the image data shown in FIG. 4, to which row numbers (beginning with L) and column numbers (beginning with C) are added for explanation. Here, it is assumed that the multivalued data of L5 is input as the correction line and the multivalued data of L10 that precedes the correction line by five lines is input as the precedent line. As the results of detecting dots to be corrected from the multivalued data of the precedent line of L10, dot data 602 is obtained.

At step 303, the dot data holding unit 212 holds 1-bit dot data detected at step 302 in a storage area, such as a line memory, not shown. It is necessary for the line memory to hold information on the lines between the correction line and the precedent line. In the present embodiment, the precedent line amount N is 5, and therefore, it is necessary to have a line memory capable of holding five or more lines. FIG. 7 shows the dot data that is held in the line memory in the case where L5 in the image data 601 shown in FIG. 6 is input as the correction line and L10 is input as the precedent line. In this case, it is known that the dot data of L5 to L9 is held in the dot data holding unit 212. The dot data holding unit 212 overwrites the dot data that is input from the dot detection unit 211 (in the example in FIG. 6, the dot data 602) to the storage area in which the corresponding dot data (dot data of L5 in FIG. 7) is held, and holds the dot data, as well as outputting the dot data to the number of linked dots derivation unit 213 in the subsequent stage. In the case of the conventional technique in which the multivalued data of 16 values (4 bits) is held as it is, it is necessary to secure a storage capacity corresponding to 4 bits×5 lines. In the present embodiment, by converting the 4-bit multivalued data into 1-bit dot data, it is possible to hold necessary data with a storage capacity ¼ of the conventional storage capacity.

Figure 8:
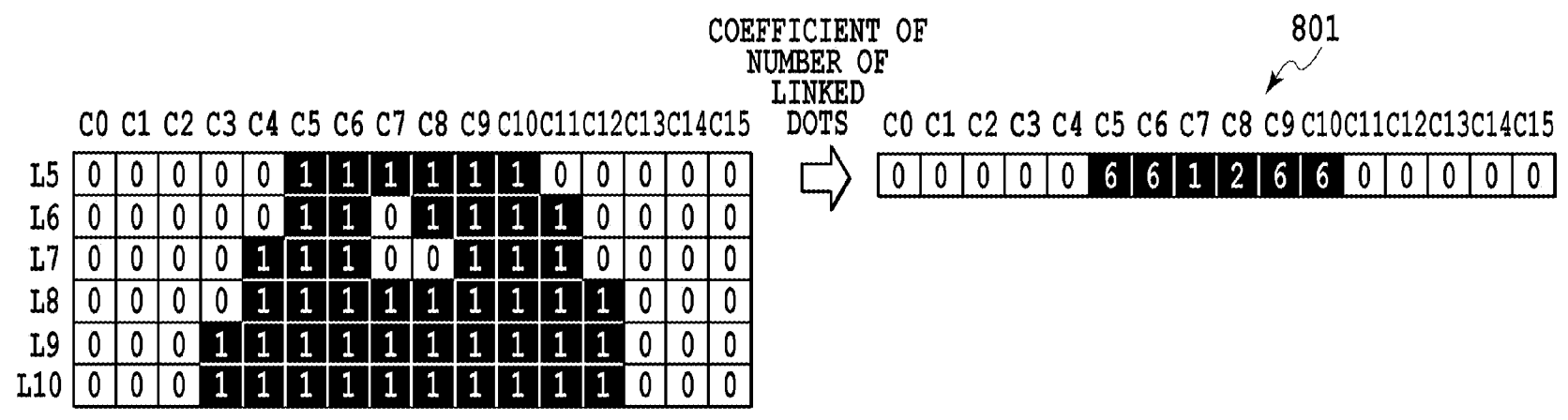

At step 304, the number of linked dots derivation unit 213 derives the number of linked dots in the sub scanning direction from the correction line down to the bottom-end edge by referring to the dot data of the precedent line that is output from the dot detection unit 211 and the dot data that is held in the dot data holding unit 212. As described above, the bottom-end edge is defined as an "edge at which the density becomes lower in the sub scanning direction and the lower of density values represents the background color". In the present embodiment, it is assumed that the background color is white (no dot is printed). Consequently, it is possible to define the bottom-end edge in different words as an "edge whose dot data changes first from '1' into '0' downstream in the sub scanning direction". At this step, how many pixels whose dot data is "1" are linked in the sub scanning direction from the correction line down to the precedent line is derived as a result. FIG. 8 shows the number of linked dots in the case where L5 in the image data 601 shown in FIG. 6 is input as the correction line. As to C0 to C4 and C11 to C15 in the image data 601, the dot data of the correction line L5 is "0", and therefore, the number of linked dots is "0". As to C5, C6, C9, and C10, the dot data of L5, which is the correction line, is "1" and the value "1" of the dot data continues down to L10, which is the precedent line, and therefore, the number of linked dots is "6". As to C7, the dot data of L5, which is the correction line, is "1", but the dot data of L6, which is the next line, is "0", and therefore, the number of linked dots in this case is "1". As to C8, the dot data of L5, which is the correction line, and that of L6, which is the next line, is "1, but the dot data of L7, which is a line that follows L6, is "0", and therefore, the number of linked dots in this case is "2". As a result of this, the derivation results of the numbers of linked dots as to the correction line L5 will be as 801 in FIG. 8.

Figure 10:
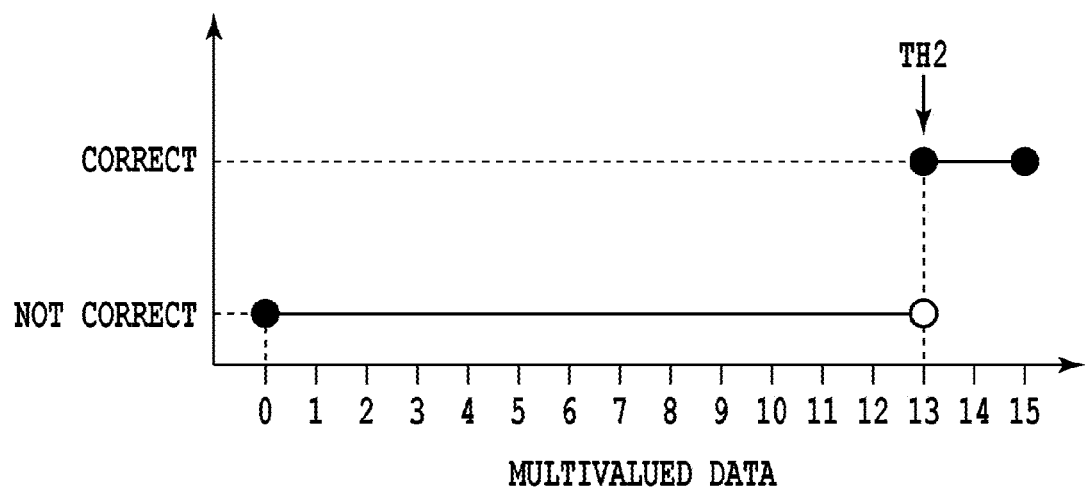
FIG. 10 is a diagram explaining the way multivalued data to be corrected is limited by using a threshold value.

At step 305, the multivalued data correction unit 214 corrects the multivalued data of the correction line based on the number of linked dots derived at step 304. The correction can be implemented by, for example, using a correction table in which the multivalued data (before correction) and the number of linked dots as the input value are associated with the multivalued data (after correction) as the output value. FIG. 9 is a diagram showing an example of the correction table according to the present embodiment and it is sufficient to prepare such a correction table in advance and to store the correction table in the main storage unit 102. It may be possible to set the value of the multivalued data after the correction (corrected multivalued data) within the correction table in accordance with the degree in which the edge effect appears, and the value of the corrected multivalued data is changed appropriately according to a change in the characteristics of the image forming unit 105 or the like. In the example of the correction table shown in FIG. 9, for the number of linked dots "0" or "6", the output value (corrected multivalued data) is not provided. This means that the number of linked dots "0" or "6" is excluded from the targets of correction because correction is not necessary in the present embodiment (i.e., the number of linked dots for which the correction is performed is limited to a range between "1 and 5"). Further, in the correction table shown in FIG. 9, the corrected multivalued data is prepared only for "13 to 15", which are the values of the multivalued data as the input values (input multivalued data). The reason is that the probability that toner will fix to a pixel is not stable in the case where the value of the multivalued data is small and a great influence will result even in the case where the value of the multivalued data is changed by only one level, and therefore, the range for which the correction is performed is limited to "13" or greater, which is the value of the multivalued data. In order to implement this, in the present embodiment, a threshold value [TH2] (here, "13") is provided for the multivalued data and the range for which the correction is performed is limited to the multivalued data whose value is equal to or greater than a predetermined value. FIG. 10 is a diagram explaining the way the multivalued data to be corrected is limited by using a threshold value and showing that the multivalued data whose values are "0 to 12" is not to be corrected and the multivalued data whose values are equal to or greater than "13" is to be corrected.

At step 306, whether the input correction line is the bottom-end line in the input multivalued data is determined. In the case where the input correction line is not the bottom-end line, the processing returns to step 601 and the processing is performed continuously on the next line. On the other hand, in the case where the input correction line is the bottom-end line, the processing is terminated.

Figure 11:
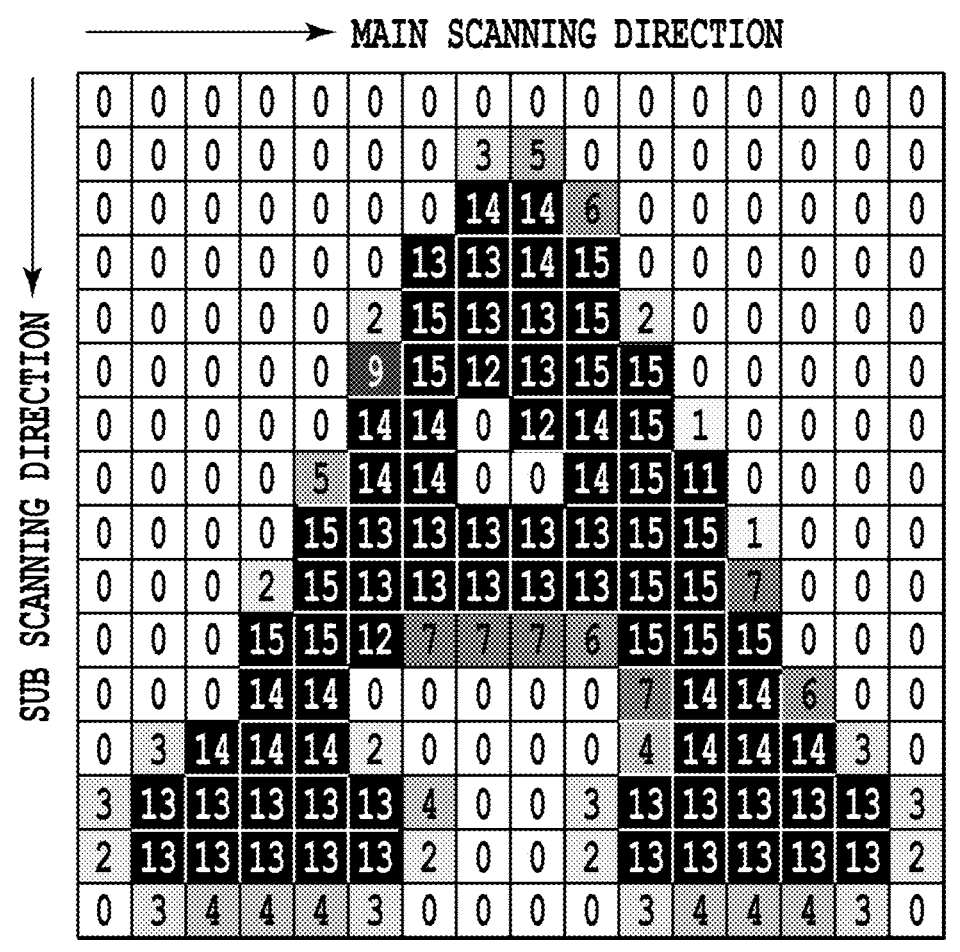

The above is the contents of the image data correction processing according to the present embodiment. FIG. 11 shows the image data after the correction (multivalued data) obtained by applying the present embodiment to the image data shown in FIG. 4 and it is known that the values of the pixels within the object become smaller (density becomes lower). In the image data in FIG. 11, before the correction line at the top-end portion is input, the precedent lines corresponding to five lines at the top-end portion are input to the precedent line input unit 202, and the dot data of the top portion of the image data is created. Further, in the case where the precedent line is outside the area of the image data, the dot data of the bottom portion of the multivalued data is created by outputting the multivalued data as "0" to the subsequent stage.

According to the present embodiment, it is possible to suppress fluctuations in density caused by the edge effect by correcting the multivalued data in accordance with the number of linked dots from the bottom-end edge. Further, the information to be held in order to derive the number of linked dots from the bottom-end edge is limited only to the dot data with a small number of bits, which is extracted from the multivalued data, and therefore, it is possible to reduce the storage capacity of the memory.

[Second Embodiment]

Next, an aspect is explained as a second embodiment in which a dot link width is derived, in addition to the number of linked dots, and the multivalued data is corrected in accordance with the distance from the bottom-end edge. Explanation of the portions in common to those of the first embodiment is omitted or simplified and in the following, different points are explained mainly.

Figure 12:
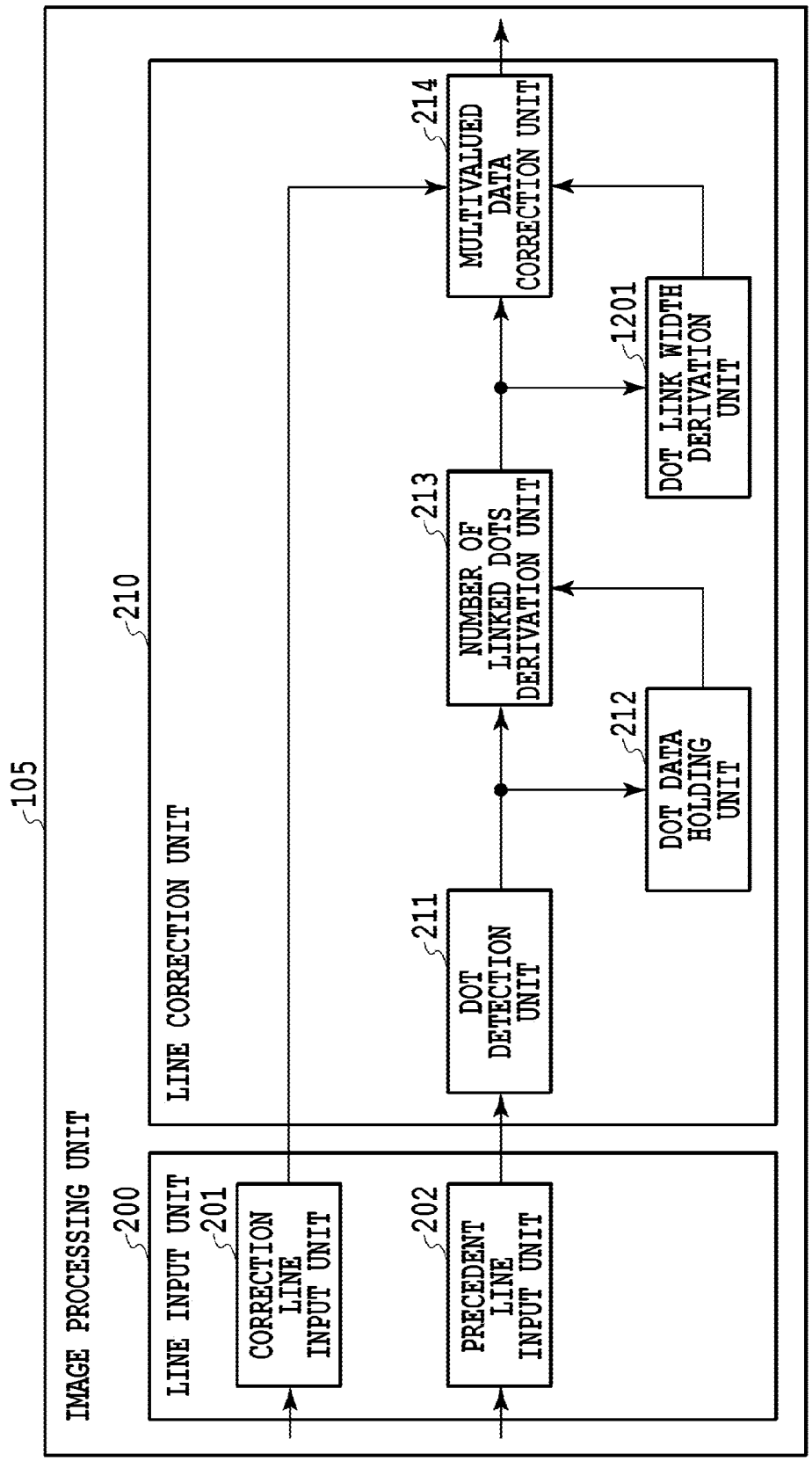
FIG. 12 is a block diagram showing an internal configuration of an image processing unit according to a second embodiment.

FIG. 12 is a block diagram showing an internal configuration of the image processing unit 103 according to the present embodiment. Within the line correction unit 210, a dot link width derivation unit 1201, which does not exist in the first embodiment, is added.

The dot link width derivation unit 1201 derives and holds the dot link width based on the number of linked dots that is output from the number of linked dots derivation unit 213, and outputs the dot link width to the multivalued data correction unit 214 in the subsequent stage. Here, the dot link width is information indicating how many dots, including the dot of the correction line, are linked from the bottom-end edge up to the top-end edge (edge whose dot data changes first from "1" into "0" upstream in the sub scanning direction).

FIGS. 13A and 13B are diagrams explaining a method for deriving and holding the dot link width. FIG. 13A shows data in the case where the image data shown in FIG. 4 described previously is taken to be the input multivalued data and the numbers of linked dots of the correction line output by the number of linked dots derivation unit 213 are overlapped for each line, and the row numbers and column numbers are added for explanation. To the dot link width derivation unit 1201, the number of linked dots is input for each line of L0 to L15. Then, the dot link width is obtained as follows for each column based on the number of linked dots that is input.

In the case where the number of linked dots that is input is "0", the dot link width is taken to be "0".

In the case where the number of linked dots that is input is other than "0", the dot link width that is held currently is compared with the input number of linked dots and on a condition that the input number of linked dots is greater, the currently held dot link width is updated to the value as a new dot link width. In the case where the input number of linked dots is smaller compared to the currently held dot link width, the value is maintained.

FIG. 13B shows data indicating the dot link width that is derived in the case where the number of linked dots shown in FIG. 13A is input for each line. In the data in FIG. 13B, for example, in C0 column, the number of linked dots down to L12 is "0", and therefore, the dot link width from L0 to L12 is "0". Then, the number of linked dots of L13 is "2", and therefore, "2" is held as the dot link width. The number of linked dots of L14 is "1", and therefore, the dot link width "2" is maintained. As to L15, the number of linked dots is "0", and therefore, the dot link width is also "0".

As to the pixel whose value of the dot link width is "6", there is a case where the actual dot link width (i.e., the number of linked dots from the bottom-end edge up to the top-end edge) is equal to or greater than "6". However, in the case where the dot link width exceeds the precedent line amount N, the dot link width does not affect largely the amount of correction, and therefore, there will arise no problem even in the case where the dot link width is output to the subsequent stage as it is.

Further, it becomes necessary to hold the information on the derived dot link width, but the maximum value of the dot link width is determined by the precedent line amount N, and therefore, in the present embodiment in which N=5, it is sufficient to have a 4-bit storage capacity for one line at the most.

Then, in the multivalued data correction unit 214, the multivalued data of the correction line is corrected based on the number of linked dots derived by the number of linked dots derivation unit 213 and the dot link width derived by the dot link width derivation unit 1201.

Figure 14:
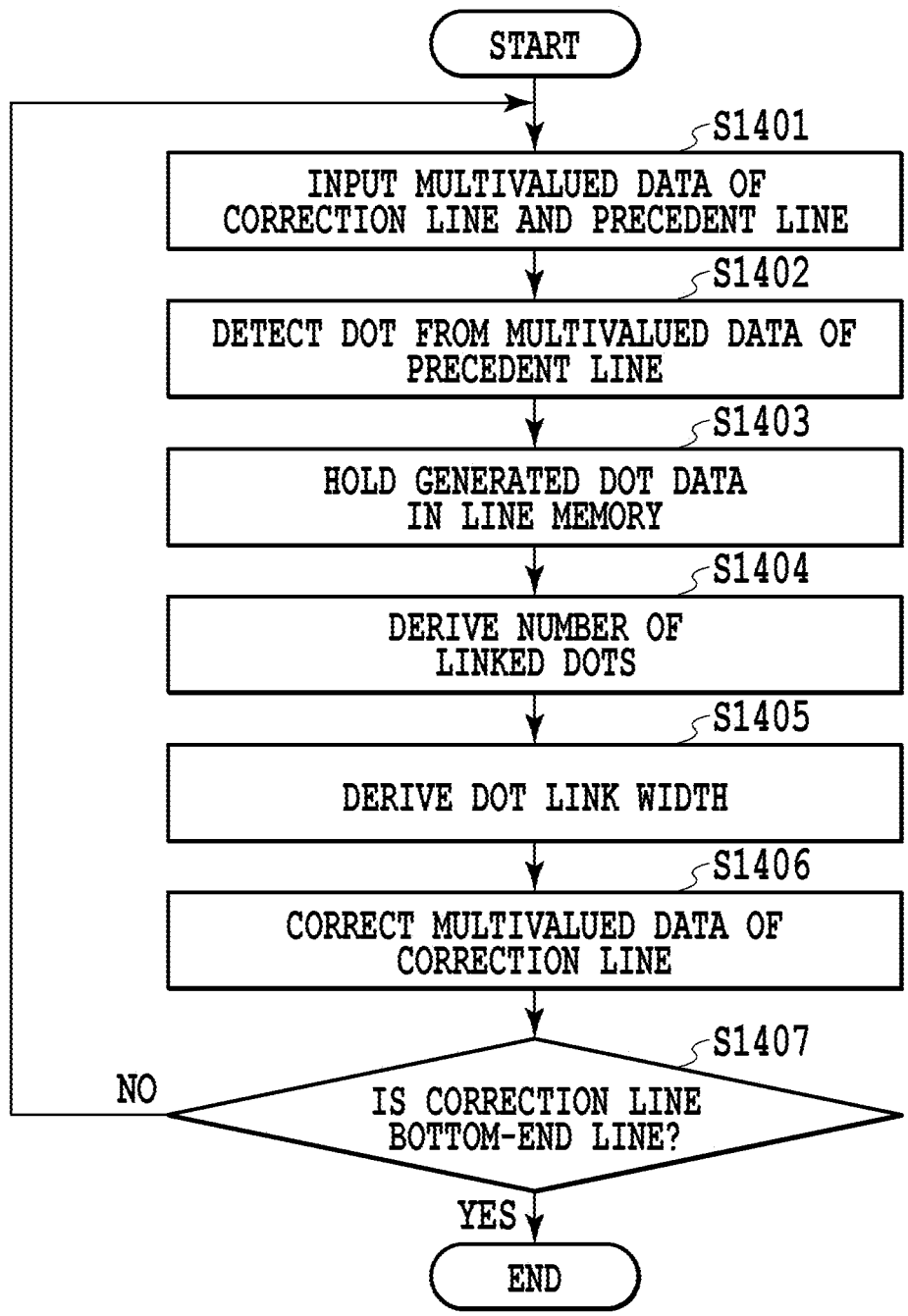
FIG. 14 is a flowchart showing a flow of image data correction processing in the image processing unit according to the second embodiment.

FIG. 14 is a flowchart showing a flow of the image data correction processing in the image processing unit 103 according to the present embodiment.

Step 1401 to step 1404 correspond to step 301 to step 304 of the flowchart in FIG. 3 in the first embodiment and they are the same, and therefore, explanation is omitted.

At step 1405, the dot link width derivation unit 1201 derives and holds the dot link width as described above based on the number of linked dots derived at step 1404. The information on the derived dot link width is output to the multivalued data correction unit 214.

At step 1406, the multivalued data correction unit 214 corrects the multivalued data of the correction line based on the number of linked dots derived at step 1404 and the dot link width derived at step 1405. This correction can be implemented by, for example, using a correction table in which the multivalued data, the number of linked dots, and the dot link width as the input value are associated with the multivalued data (corrected multivalued data) as the output value. FIG. 15 is a diagram showing an example of the correction table used for the multivalued data correction of the present embodiment. The degree in which the edge effect appears fluctuates also depending on the dot link width, and therefore, it is made possible to perform a correction with high accuracy by adjusting the corrected multivalued data in accordance with the dot link width. In the case where the dot link width is small, the output density is unstable inherently, and therefore, it is preferable not to perform an additional correction. Because of this, in the contents of the correction table shown in FIG. 15, corrected multivalued data is prepared only for the dot link widths having a width equal to or greater than a predetermined width (here, the value of the width is equal to or greater than "4") and the pixel whose dot link width is less than the predetermined width is not corrected. In the correction table in FIG. 15, the value of the input multivalued data to be corrected is limited only to "15", but it is needless to say that the value is not limited to "15".

At step 1407, whether the input correction line is the bottom-end line in the input multivalued data is determined. In the case where the input correction line is not the bottom-end line, the processing returns to step 1401 and the processing is performed continuously on the next line. On the other hand, in the case where the input correction line is the bottom-end line, the processing is terminated.

Figure 16:
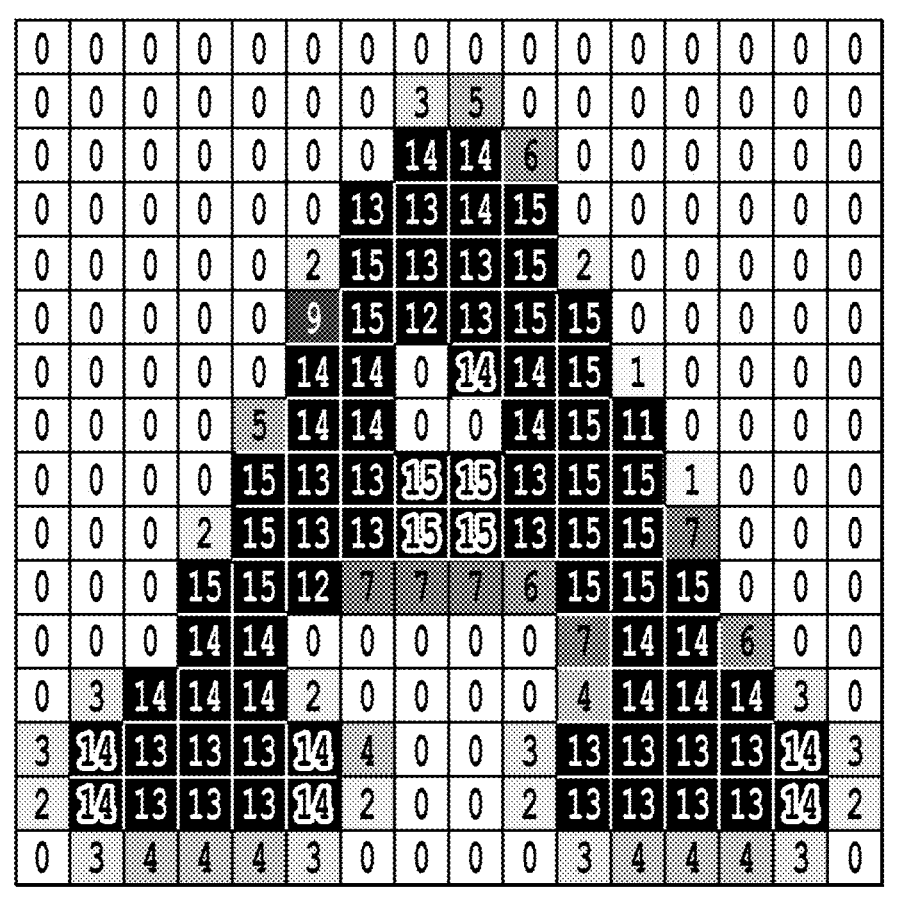

The above is the contents of the image data correction processing according to the present embodiment. FIG. 16 shows image data (multivalued data) after the correction obtained by applying the present embodiment to the image data shown in FIG. 4. It is known from the comparison with FIG. 11 in the case where the first embodiment is applied that some pixels maintain the original densities or have greater density values.

According to the present embodiment, it is made possible to correct multivalued data with higher accuracy and it is possible to prevent the output density from becoming unstable due to an over-correction.

[Third Embodiment]

Next, an aspect is explained as a third embodiment in which the number of linked dots is counted by a counter. Explanation of the portions in common to those of the first embodiment is omitted or simplified and in the following, different points are explained mainly.

Figure 17:
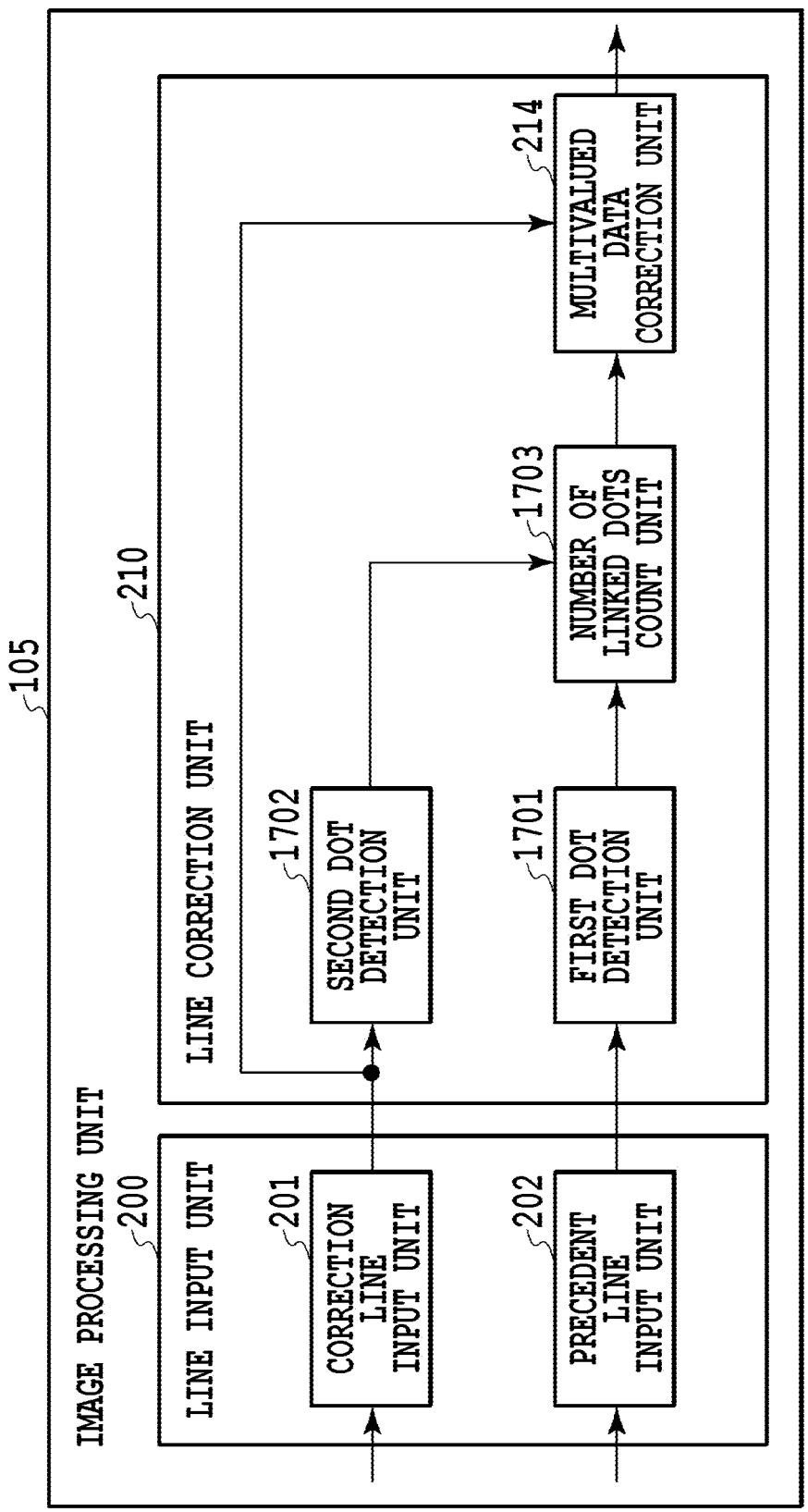
FIG. 17 is a block diagram showing an internal configuration of an image processing unit according to a third embodiment.

FIG. 17 is a block diagram showing an internal configuration of the image processing unit 103 according to the present embodiment. The configuration of the line correction unit 210 is different in the following points compared to the block diagram in FIG. 2 of the first embodiment.

First, two dot detection units are provided. Specifically, there exist a first dot detection unit 1701 (corresponding to the dot detection unit 211 of the first embodiment) configured to detect dots of the precedent line that is input to the precedent line input unit 202 and a second dot detection unit 1702 configured to detect dots of the correction line that is input to the correction line input unit 201.

The dot detection in the second dot detection unit 1702 is also performed by comparing the value of multivalued data with a threshold value as in the first dot detection unit 1701 (see FIG. 5 described previously). In the second dot detection unit 1702 also, conversion into dot data is carried out by using the same reference as that of the first dot detection unit 1701, and therefore, the value of the threshold value [TH1] is the same as the value in the case of the first dot detection unit 1701 (i.e., the dot detection unit 211). Then, the dot data as the detection results by the first and second dot detection units is input to a number of linked dots count unit 1703.

Figure 18:
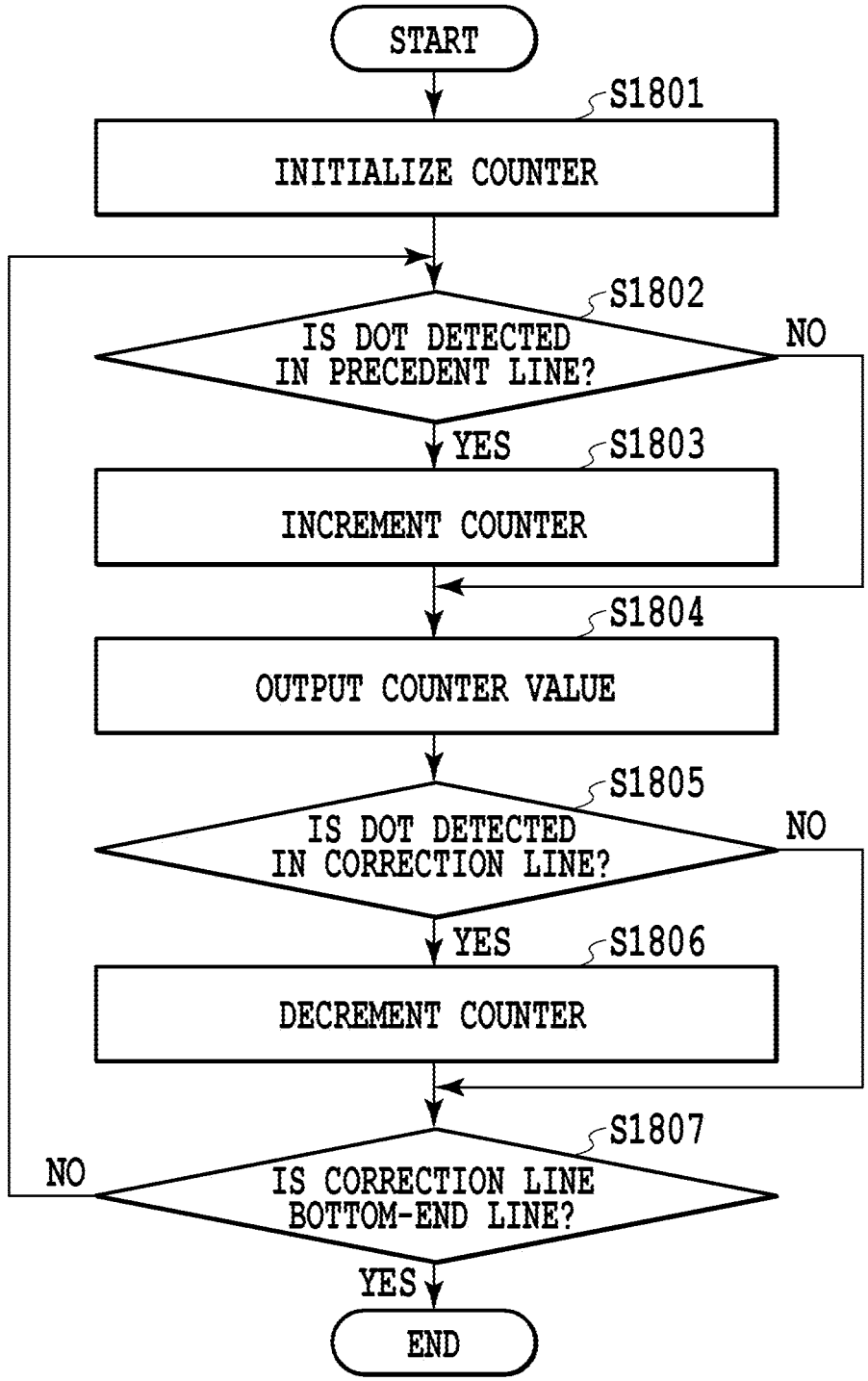
FIG. 18 is a flowchart showing a flow of processing to count the number of linked dots using a counter according to the third embodiment.

The number of linked dots count unit 1703 counts the number of linked dots by using a counter based on the dot data of the correction line that is input from the first dot detection unit 1701 and the dot data of the precedent line that is input from the second dot detection unit 1702. In the present embodiment, the counter is provided for each column of one line and the number of linked dots from the bottom-end edge up to the correction line is counted in accordance with the flowchart shown in FIG. 18. Hereinafter, the operation to count the number of linked dots in the present embodiment is explained in accordance with the flowchart in FIG. 18.

At step 1801, the counter is initialized (0 is set).

At step 1802, whether a dot is detected by the first dot detection unit 1701 (i.e., in the pixel of the precedent line) is determined. In the case where a dot is detected by the first dot detection unit 1701 (in the case where dot data is "1"), the processing proceeds to step 1803. On the other hand, in the case where no dot is detected by the first dot detection unit 1701 (in the case where dot data is "0"), the processing proceeds to step 1804.

At step 1803, the counter is incremented (+1).

At step 1804, the current counter value is output as the number of linked dots.

At step 1805, whether a dot is detected by the second dot detection unit 1702 (i.e., in the pixel of the correction line) is determined. In the case where a dot is detected by the second dot detection unit 1702 (in the case where dot data is "1"), the processing proceeds to step 1806. On the other hand, in the case where no dot is detected by the second dot detection unit 1702 (in the case where dot data is "0"), the processing proceeds to step 1807.

At step 1806, the counter is decremented (−1).

At step 1807, whether the correction line is the bottom-end line of the input multivalued data is determined. In the case where the correction line is the bottom-end line, the processing is terminated. On the other hand, in the case where the correction line is not the bottom-end line, the processing returns to step 1802 and the processing is performed on the next line. In this manner, the number of linked dots from the bottom-end line up to the correction line is counted.

Figure 19:
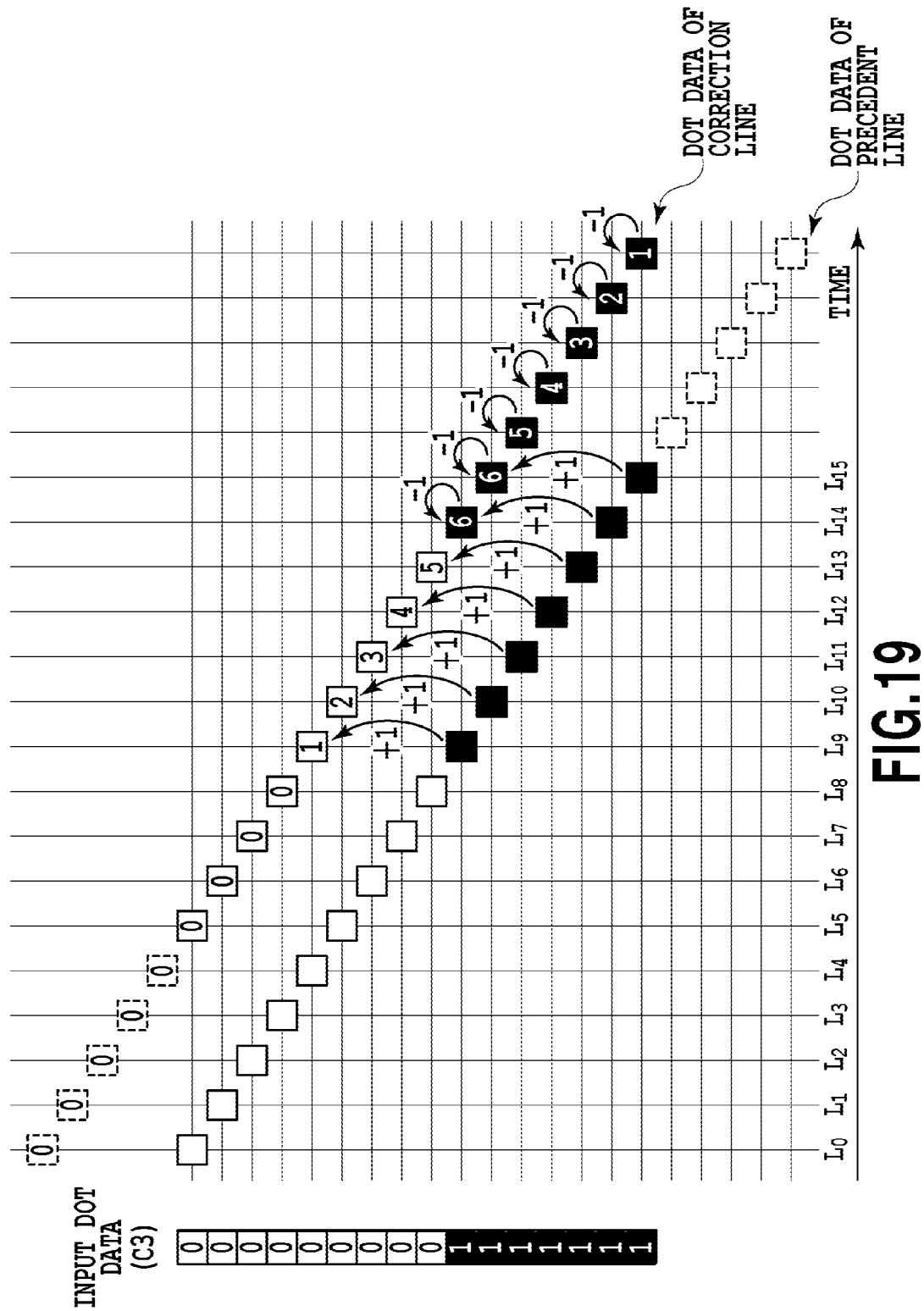
FIG. 19 is a diagram explaining a change in counter value for a dot data column that is input.

FIG. 19 is a diagram explaining a change in counter value for the input dot data column. In FIG. 19, the dot detection results in the case where C3 column of the image data shown in FIG. 6 is taken to be the input dot data column are shown. The square located above with respect to the same time indicates the dot data of the correction line, indicating "1" in black and "0" in white, respectively, and the numerical value within the square indicates the output value (number of linked dots) of the counter. The square located below with respect to the same time indicates the dot data of the precedent line, similarly indicating "1" in black and "0" in white, respectively. For each line, the dot data of the precedent line and the correction line is input and in the case where the dot data of the precedent line is "1 (black)", the counter is incremented and the counter value is output. After that, in the case where the dot data of the correction line becomes "1 (black)", the counter is decremented. As to the top-end portion of the input dot data, before the dot data is input to the top-end portion of the correction line, the five precedent lines are input, and as to the bottom-end portion of the input dot data, in the case where the precedent line is outside the dot data area, the dot data is taken to be "0".

FIG. 20 shows the numbers of linked dots that are obtained as the results of applying the above-described count processing to the image data shown in FIG. 4 (FIG. 6). The numbers of linked dots that are obtained as above are output to the multivalued data correction unit 214.

The counter value that is output from the number of linked dots count unit 1703 is the number of pixels, in which a dot is detected, between the correction line and the precedent line that precedes the correction line. Because of this, as to C5 to C9 columns, the gap between the dot links is narrower than the precedent line amount N and the number of linked dots different from the data shown in FIG. 13A described previously is output partially. Specifically, in L7 to L10 of C5 column, L9 and L10 of C6 column, L3 to L5 in C7 column, and L9 and L10 in C9 column, the numbers of linked dots in FIG. 20 are greater than the values in FIG. 13A. As a result of this, in the case where the multivalued data is corrected based on the numbers of linked dots that are derived in the present embodiment, fluctuations in density on the periphery of the bottom-end edge remain somewhat (insufficient correction results). However, in many images, such as documents, which are printed actually by a printer, the number of linked dots is great and the distance between the dot links is great in many cases, and therefore, there is not a great influence even in the case where the correction of multivalued data is performed based on the numbers of linked dots that are obtained in the present embodiment.

On the other hand, the amount of information that should be held may be smaller compared to that of the first embodiment. The case of the present embodiment can be implemented by providing 4-bit counters for each column in the number corresponding to one line, and therefore, the effect of reducing the circuit scale is greater than that of the first embodiment in which dot data is held in the line memory. Then, as the precedent line amount N increases, the reduction effect becomes greater compared to the case where dot data is held in the line memory.

Further, it may also be possible to derive and hold the dot link width by applying the second embodiment and to change the corrected multivalued data in accordance with the dot link width (or not to correct multivalued data).

[Fourth Embodiment]

Next, based on the third embodiment, an aspect is explained as a fourth embodiment in which the number of linked dots is counted accurately by using a plurality of counters. Explanation of the portions in common to those of the third embodiment is omitted or simplified and in the following, different points are explained mainly.

In the present embodiment, an accurate count of the number of linked dots is implemented by using a plurality of counters. Hereinafter, the count operation according to the present embodiment is explained.

The number of linked dots count unit 1703 in the present embodiment counts the number of linked dots by controlling a plurality of counters using a precedent line side counter pointer [Pp] and a correction line side counter pointer [Pc]. Here, the number of counters is determined according to how many dot links (aggregation of successive dots) can exist between the precedent line and the correction line. In other words, the maximum value of the counter is $\{1+(N/2)\}$ (decimal fractions are rounded down) where N is the precedent line amount. Then, the value of the corresponding counter pointer takes a range between 0 and $\{1+(N/2)\}$ and the value of each counter pointer is associated with each counter. The number of linked dots is output by the corresponding counter being selected by the value indicated by the counter pointer.

Figure 21:
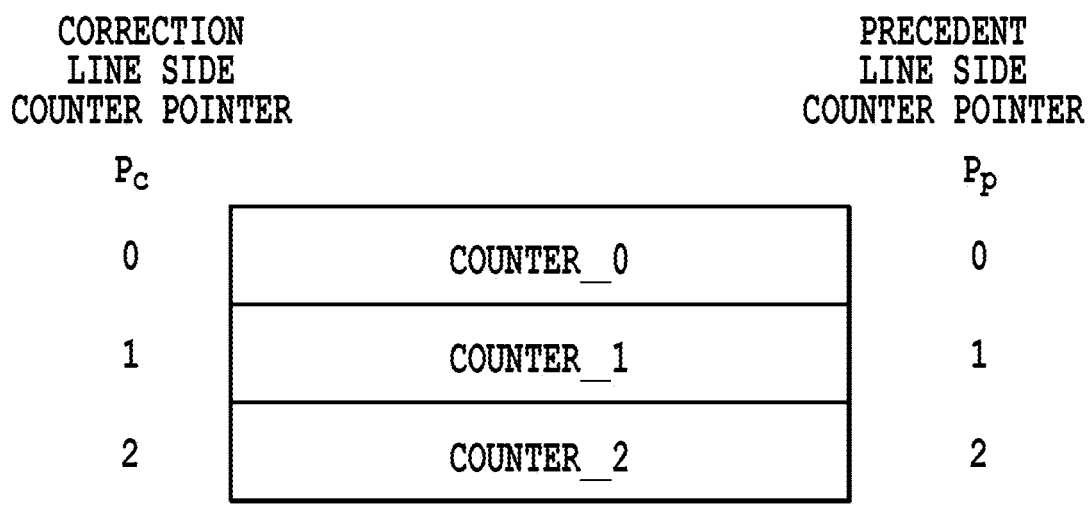
FIG. 21 is a diagram explaining a count operation using a plurality of counters according to a fourth embodiment.

FIG. 21 is a diagram explaining the count operation using a plurality of counters according to the present embodiment. The example in FIG. 21 shows the way the values "0 to 2" of the correction line side counter pointer [Pc] and the precedent line side counter pointer [Pc] are associated with each other in a one-to-one manner for each of three counters on the assumption that N=5.

Figure 22:
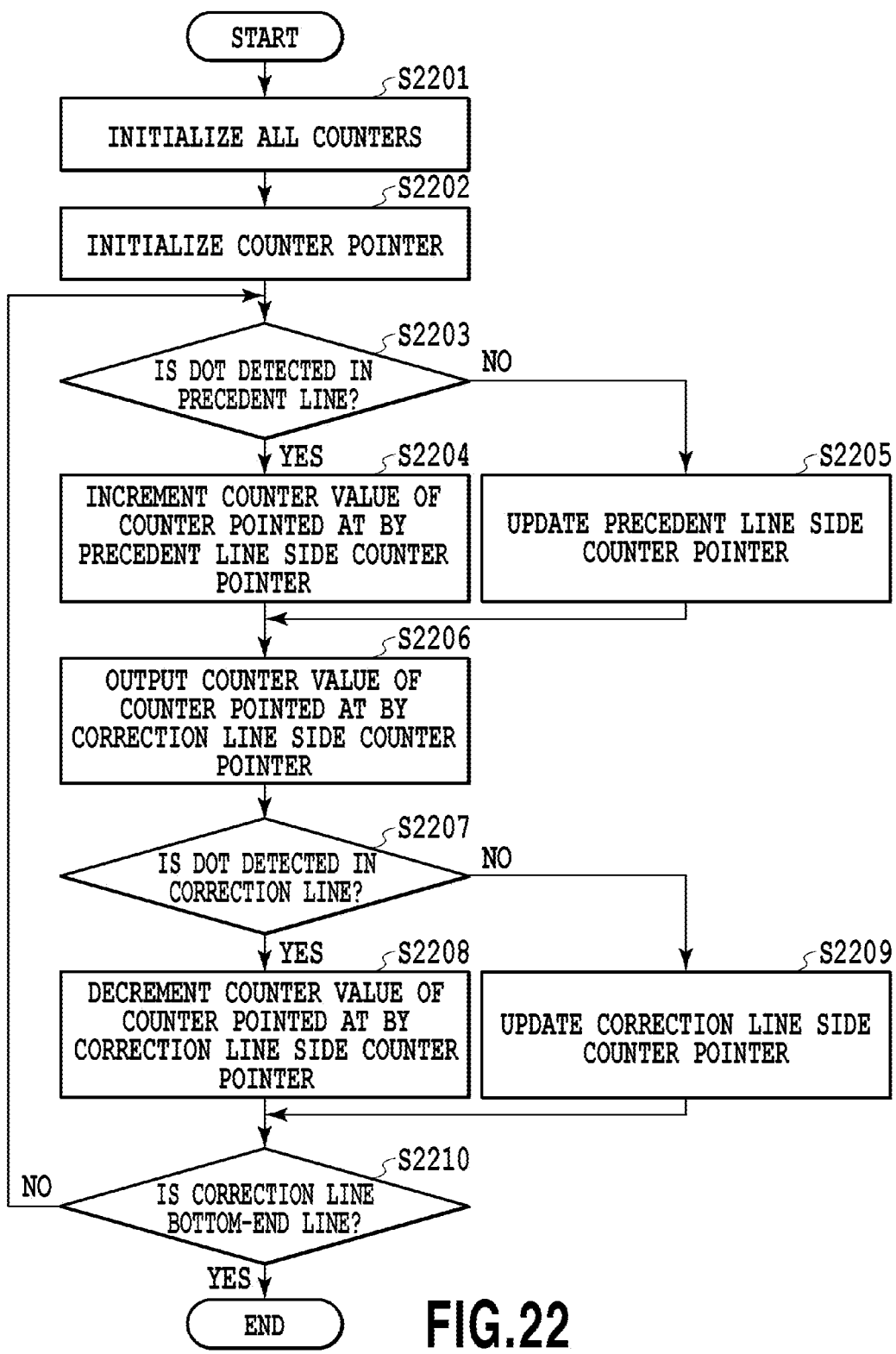
FIG. 22 is a flowchart showing a flow of processing to count the number of linked dots according to the fourth embodiment.

In the present embodiment, the counters to be used for outputting are switched according to the values of the precedent line side counter pointer [Pp] and the correction line side counter pointer [Pc] based on the dot data that is input from the first dot detection unit 1701 and the second dot detection unit 1702, respectively. FIG. 22 is a flowchart showing a flow of processing to count the number of linked dots in the present embodiment. Hereinafter, explanation is given by premising the case where N=5 shown in FIG. 21.

At step 2201, all the counters are initialized ("0" is set).

At step 2202, the precedent line side counter pointer [Pp] and the correction line side counter pointer [Pc] are initialized ("0" is set), respectively. Due to this initialization, both counter pointers come to point at the same counter (counter_0).

At step 2203, whether or not a dot is detected in the pixel of the precedent line is determined. In the case where a dot is detected in the pixel of the precedent line (in the case where the dot data that is input from the first dot detection unit 1701 is "1"), the processing proceeds to step 2204. On the other hand, in the case where no dot is detected in the pixel of the precedent line (in the case where the dot data that is input from the first dot detection unit 1701 is "0"), the processing proceeds to step 2205.

At step 2204, the counter value that is pointed at by the precedent line side counter pointer [Pp] is incremented.

At step 2205, the value of the precedent line side counter pointer [Pp] is updated (here, incremented). For example, in the case of C7 column of the image data in FIG. 20 described previously, in the dot link of L1 to L5, the value of the precedent line side counter pointer [Pp] is "0", but in the dot link of L8 to L10, the value of the counter pointer [Pp] is "1"

due to the updating. In other words, the counter that is pointed at by the precedent line side counter pointer [Pp] is [counter_0] in L1 to L5, but the counter is [counter_1] in L8 to L10. Due to the updating, the counter that is pointed at by the correction line side counter pointer [Pc] and the counter that is pointed at by the precedent line side counter pointer [Pp] are different until the correction line side counter pointer [Pc] is updated at step 2209, to be described later. In the case of the updating after the plurality of (here, three) counters has all been specified once, all the counters are returned to the initial value ("0" in the present embodiment) of the counter pointer.

At step 2206, the counter value of the counter that is pointed at by the correction line side counter pointer [Pc] is output as the number of linked dots.

At step 2207, whether or not a dot is detected in the pixel of the correction line is determined. In the case where a dot is detected in the pixel of the correction line (in the case where the dot data that is input from the second dot detection unit 1702 is "1"), the processing proceeds to step 2208. On the other hand, in the case where no dot is detected in the pixel of the correction line (in the case where the dot data that is input from the second dot detection unit 1702 is "0"), the processing proceeds to step 2209.

At step 2208, the counter value of the counter that is pointed at by the correction line side counter pointer [Pc] is decremented.

At step 2209, the value of the correction line side counter pointer [Pc] is updated (here, incremented). Here, it is assumed that the order of the updating of the value that specifies a counter is the same as that of the updating of the precedent line side counter pointer at step 2205. In other words, in the case where the initial value of the precedent line side counter pointer [Pp] is set to "3" and the counter to be specified is changed by decrementing the value (−1) at the time of updating, after the initial value of the correction line side counter pointer [Pc] is also set to "3" and then the value is decremented.

At step 2210, whether the correction line is the bottom-end line of the input multivalued data is determined. In the case where the correction line is the bottom-end line, the processing is terminated. On the other hand, in the case where the correction line is not the bottom-end line, the processing returns to step 2203 and the processing is performed on the next line.

The above is the flow of the operation to count the number of linked dots in the present embodiment.

According to the present embodiment, different from the third embodiment, one counter is used for each dot link between the correction line and the precedent line, and therefore, even in the case where the gap between the dot links is equal to or less than the precedent line amount N, it is made possible to perform the density correction exactly in accordance with the distance from the bottom-end edge.

Further, the number of counters is {1+ (precedent line amount N)/2} at the most, and therefore, it is possible to reduce the circuit scale more than the case where input multivalued data is held directly in the line memory as in the conventional technique.

[Fifth Embodiment]

Next, based on the third embodiment, an aspect is explained as a fifth embodiment in which multivalued data is not corrected in the case of the dot link width that will cause an unstable output density. In the following, different points from the third embodiment are explained mainly.

The number of linked dots count unit 1703 according to the present embodiment resets the counter and does not correct multivalued data for the dot link having a dot link width that will cause an unstable output density (hereinafter, a minimum link width) at the time of counting the number of linked dots. Specifically, the number of linked dots count unit 1703 resets the counter for the dot link having a dot link width less than the minimum link width set in advance based on the dot detection results of the correction line and the precedent line, and performs control so that the number of linked dots that is output is 0.

Figure 23:
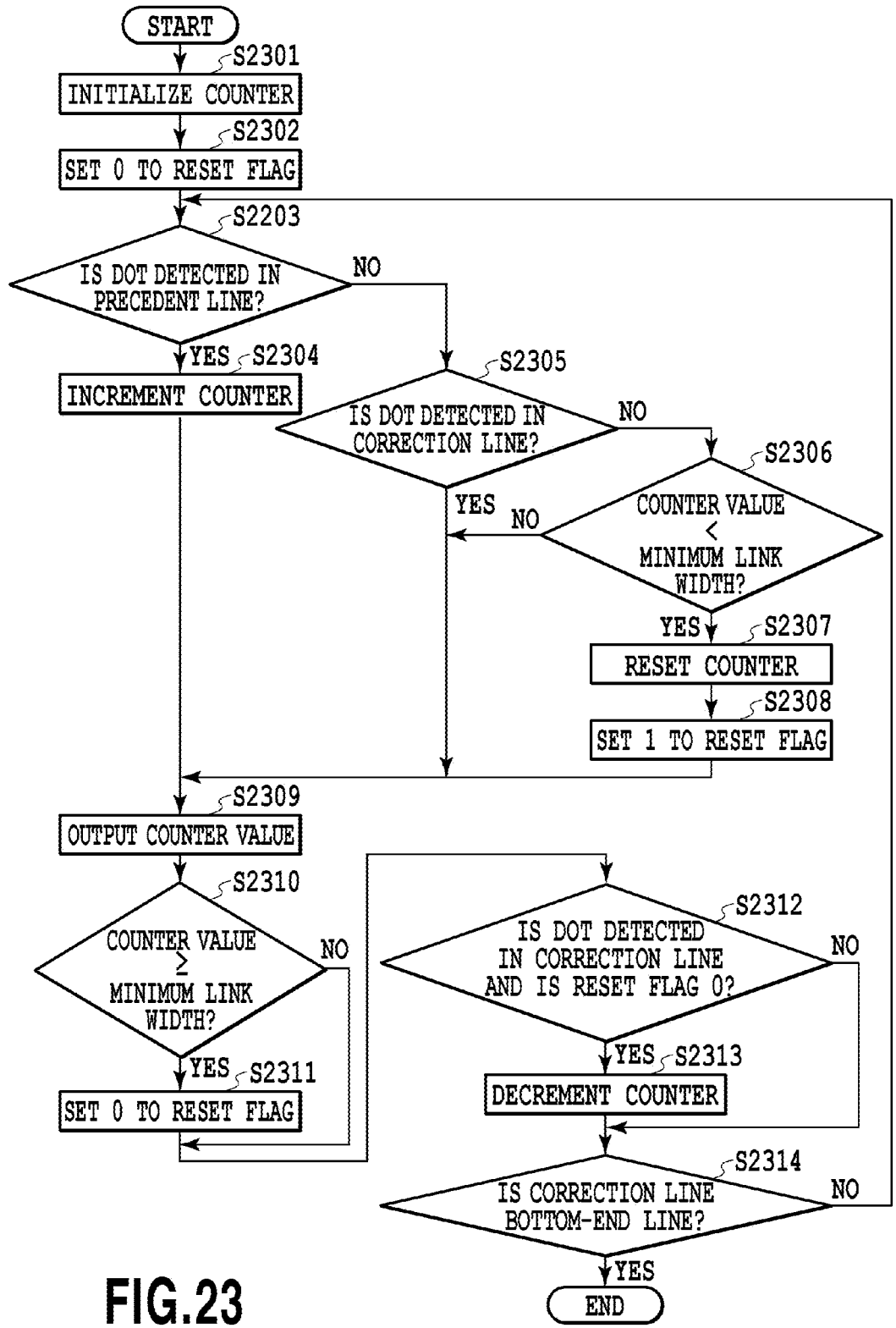
FIG. 23 is a flowchart showing a flow of processing to count the number of linked dots according to a fifth embodiment.

FIG. 23 is a flowchart showing a flow of the processing to count the number of linked dots in the number of linked dots count unit 1703 according to the present embodiment.

At step 2301, the counter is initialized (0 is set).

At step 2302, a flag used to reset the counter (hereinafter, a reset flag) is set to "0". The reset flag is a flag holding one bit for each column and in the case where there is a dot link having a dot link width less than the minimum link width between the correction line and the precedent line and the counter is reset, "1" is set as a value indicating that.

At step 2303, whether a dot is detected by the first dot detection unit 1701 (i.e., in the pixel of the precedent line) is determined. In the case where a dot is detected by the first dot detection unit 1701 (in the case where dot data is "1"), the processing proceeds to step 2304. On the other hand, in the case where no dot is detected by the first dot detection unit 1701 (in the case where dot data is "0"), the processing proceeds to step 2305.

At step 2304, the counter is incremented (+1).

At step 2305, whether a dot is detected by the second dot detection unit 1702 (i.e., in the pixel of the correction line) is determined. In the case where a dot is detected by the second dot detection unit 1702 (in the case where dot data is "1"), the processing proceeds to step 2309. On the other hand, in the case where no dot is detected by the second dot detection unit 1702 (in the case where dot data is "0"), the processing proceeds to step 2306.

At step 2306, whether the counter value is less than a predetermined threshold value that specifies the minimum link width is determined. In the present embodiment, the case where the predetermined threshold value that specifies the minimum link width is set to "4" is supposed. In the case where the results of the determination indicate that the counter value is less than the predetermined threshold value, the processing proceeds to step 2307. On the other hand, in the case where the counter value is equal to or greater than the predetermined threshold value, the processing proceeds to step 2309.

Figure 24:
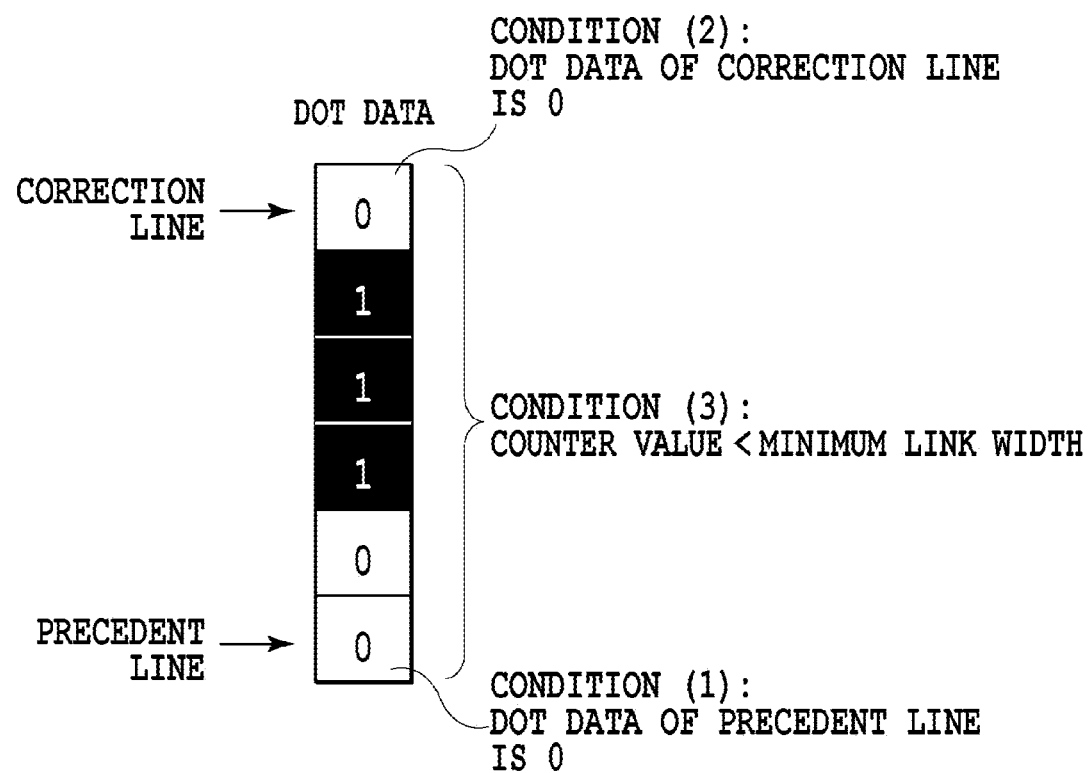
FIG. 24 shows a condition of branching processing at step 2306.

At step 2307, the counter is reset ("0" is set). FIG. 24 schematically shows the condition for the processing to proceed to step 2307 in the case where the precedent line amount N is set to "5" and the threshold value that specifies the minimum link width is set to "4". FIG. 24 shows that the counter is reset in the case where a dot link whose link width is less than four dots (in FIG. 24, three-dot link) exists between the correction line and the precedent line.

At step 2308, "1" is set to the above-described reset flag.

At step 2309, the current counter value is output as the number of linked dots.

At step 2310, whether the counter value is equal to or greater than the predetermined threshold value that specifies the minimum link width. In the case where the results of the determination indicate that the counter value is equal to or greater than the predetermined threshold value, the processing proceeds to step 2311. On the other hand, in the case where the counter value is less than the predetermined threshold value, the processing proceeds to step 2312.

At step 2311, "0" is set to the above-described reset flag. While "1" set to the reset flag is being kept, decrement of the counter at step 2313 in the subsequent stage is not performed. While "1" set to the reset flag is being kept, in the precedent line, only the number of linked dots located downstream of the dot link having a dot link width less than the minimum link width, which has caused the reset flag to be set to "1", is counted. At this time, what satisfies the condition (the counter value is equal to or greater than the minimum link width) for the reset flag to be set to "0" is the case where the dot link having a dot link width less than the minimum link width no longer exists between the precedent line and the correction line and the possibility that there will exist a dot link that needs correction and which has a dot link width equal to or greater than the minimum link width is strong. Because of this, "0" is set to the reset flag and the information indicating that the counter is reset due to the dot link having a dot link width less than the minimum link width is deleted at this step.

At step 2312, whether a dot is detected by the second dot detection unit 1702 (i.e., in the pixel of the correction line) and the reset flag is "0" is determined. In the case where a dot is detected by the second dot detection unit 1702 (dot data is "1") and the reset flag is "0", the processing proceeds to step 2313. On the other hand, in other cases, the processing proceeds to step 2314.

At step 2313, the counter is decremented (−1). At this time, in the case where the counter value is already "0", decrement is not performed.

At step 2314, whether the correction line is the bottom-end line of the input multivalued data is determined. In the case where the correction line is the bottom-end line, the processing is terminated. On the other hand, in the case where the correction line is not the bottom-end line, the processing returns to step 2303 and the processing is performed on the next line.

The above is the flow of the operation to count the number of linked dots in the present embodiment. As the results of performing the count operation in this manner, as to the dot link having a dot link width less than the minimum link width, the number of linked dots is output as "0".

FIG. 25 shows the numbers of linked dots obtained as the results of applying the above-described processing to count the number of linked dots to the image data shown in FIG. 4. In the case of FIG. 25, in L13 and L14 of C0 column, L13 and L14 of C6 column, L8 to L10 in C7 column, L8 to L10 in C8 column, L13 and L14 in C9 column, and L13 and L14 in C15 column, the numbers of linked dots for which values equal to or greater than "1" should be output originally are all changed into "0".

According to the present embodiment, for the dot link that will cause an unstable output density, it is made possible not to correct multivalued data while keeping an increase in cost to a minimum.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to implement suppression of the edge effect at a low cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-157828 filed Aug. 1, 2014, which is hereby incorporated by reference wherein in its entirety.

What is claimed is:

1. An image processing apparatus that corrects multivalued data on which halftone processing has been performed, the image processing apparatus comprising:

a first input unit configured to input multivalued data of a correction line to be corrected among the multivalued data;

a second input unit configured to input multivalued data of a precedent line that precedes the correction line by N lines;

a detection unit configured to detect a number of linked dots, wherein the number of linked dots indicates how many pixels having a pixel value that is equal to or greater than a predetermined threshold value are linked in the multivalued data in a sub scanning direction from a bottom-end edge located closest to the correction line to the correction line; and a line correction unit configured to determine whether to correct each pixel in the correction line based on the number of linked dots indicated by the detection unit and correct the multivalued data of the pixel determined to be corrected in the correction line inputted by the first input unit, wherein the detection unit has a counter for counting pixels having a pixel value that is equal to or greater than a predetermined threshold value and controls a counter value of the counter based on a result of detecting pixels having a pixel value that is less than a predetermined threshold value between the correction line and the precedent line, so as to detect the number of linked dots that are linked from a side of the correction line to the bottom-end edge in the sub scanning direction, and the bottom-end edge is an edge at which the density becomes lower in the sub scanning direction and the lower of density values represents the background color.

2. The image processing apparatus according to claim 1, wherein the detection unit compares the multivalued data of the precedent line with a predetermined threshold value and detects the multivalued data equal to or greater than the predetermined threshold value as the dot.

3. The image processing apparatus according to claim 1, wherein the line correction unit determines to correct a pixel having multivalued data equal to or greater than a predetermined value in a case where the number of linked dots is not less than a first predetermined number and not greater than a second predetermined number.

4. The image processing apparatus according to claim 1, wherein
the line correction unit determines to correct a pixel in a case where the number of linked dots that is not less than a first predetermined number is not greater than a second predetermined number.

5. The image processing apparatus according to claim 1, wherein
the line correction unit performs the correction by using a correction table in which multivalued data before the correction and the number of linked dots are associated with multivalued data after the correction.

6. The image processing apparatus according to claim 1, wherein
the line correction unit further corrects the multivalued data based on a dot link width representing the number of linked dots from the bottom-end edge up to a top-end edge.

7. The image processing apparatus according to claim 6, wherein
the line correction unit determines not to correct the multivalued data for a pixel having a dot link width less than a predetermined width.

8. The image processing apparatus according to claim 6, wherein
the line correction unit performs the correction by using a correction table in which multivalued data before the correction, the number of linked dots, and the dot link width are associated with multivalued data after the correction.

9. The image processing apparatus according to claim 1, wherein the derivation of the number of linked dots using the counter is implemented by:
incrementing the counter in a case where a pixel having a pixel value that is equal to or greater than a predetermined threshold value is detected in the multivalued data of the precedent line; and
decrementing the counter in a case where a pixel having a pixel value that is equal to or greater than a predetermined threshold value is detected in the multivalued data of the correction line.

10. The image processing apparatus according to claim 9, wherein
in a case where no pixel having a pixel value that is equal to or greater than a predetermined threshold value is detected in the multivalued data of the precedent line and the correction line and the counter value of the counter is less than a predetermined threshold value, on a condition that the dot link width is less than a predetermined width, the correction is not performed by resetting the counter.

11. The image processing apparatus according to claim 1, wherein
the number of linked dots is counted by providing $\{1+(N/2)\}$ counters and using one counter for each dot link between the correction line and the precedent line.

12. The image processing apparatus according to claim 1, wherein
the counter is a counter holding a counter value for each pixel in a main scanning direction, and
the detection unit increments the counter in a case where the pixel having the pixel value that is equal to or greater than the predetermined threshold value is detected in the precedent line and outputs the counter value of the counter in a case where the pixel having the pixel value that is less than the predetermined threshold value is detected in the precedent line.

13. The image processing apparatus according to claim 1, wherein
the counter has a plurality of counters each holding a counter value for each pixel in a main scanning direction, and
the detection unit switches the counters for counting the pixel having the pixel value that is equal to or greater than the predetermined threshold value in a case where the pixel having the pixel value that is less than the predetermined threshold value is detected.

14. The image processing apparatus according to claim 13, wherein
with respect to a pixel of interest in the correction line, the detection unit holds information identifying, among the plurality of counters, a counter holding a number of linked dots from the bottom-end edge located closest to a position of the pixel of interest.

15. The image processing apparatus according to claim 1, wherein
the counter is incremented in a case where the pixel having the pixel value that is equal to or greater than the predetermined threshold value is detected.

16. The image processing apparatus according to claim 1, wherein the detection unit comprises:
a conversion unit configured to convert the multivalued data of the correction line into dot data by quantization; and
a holding unit configured to hold the dot data for lines from the correction line to the precedent line, wherein
in the dot data, the detection unit counts a pixel that is a quantization value in which a pixel value represents a dot, as the pixel having the pixel value that is equal to or greater than the predetermined threshold value.

17. The image processing apparatus according to claim 1, wherein the detection unit comprises:
a first conversion unit configured to convert the multivalued data of the correction line into first dot data by quantization; and
a second conversion unit configured to convert the multivalued data of the precedent line into second dot data by quantization,
wherein the detection unit controls the counter based on the first dot data and the second dot data.

18. An image processing method for correcting multivalued data on which halftone processing has been performed, the method comprising the steps of:
inputting multivalued data of a correction line to be corrected among the multivalued data;
inputting multivalued data of a precedent line that precedes the correction line by N lines;
detecting a number of linked dots, wherein the number of linked dots indicates how many pixels having a pixel value that is equal to or greater than a predetermined threshold value are linked in the multivalued data in a sub scanning direction from a bottom-end edge located closest to the correction line to the correction line;

determining whether to correct each pixel in the correction line based on the detected number of linked dots; and correcting the multivalued data of the pixel in the correction line determined to be corrected, wherein the detecting the number of linked dots includes counting pixels having a pixel value that is equal to or greater than a predetermined threshold value and controlling a counter value of a counter based on a result of detecting pixels having a pixel value that is less than a predetermined threshold value between the correction line and the precedent line, so as to detect the number of linked dots that are linked from a side of the correction line to the bottom-end edge in the sub scanning direction, and the bottom-end edge is an edge at which the density becomes lower in the sub scanning direction and the lower of density values represents the background color.

19. A non-transitory computer readable storage medium storing a program that, when executed, causes a computer to perform inputting multivalued data of a correction line to be corrected among the multivalued data;

inputting multivalued data of a precedent line that precedes the correction line by N lines;

detecting a number of linked dots, wherein the number of linked dots indicates how many pixels having a pixel value that is equal to or greater than a predetermined threshold value are linked in the multivalued data in a sub scanning direction from a bottom-end edge located closest to the correction line to the correction line;

determining whether to correct each pixel in the correction line based on the detected number of linked dots; and correcting the multivalued data of the pixel in the correction line determined to be corrected, wherein the detecting the number of linked dots includes counting pixels having a pixel value that is equal to or greater than a predetermined threshold value and controlling a counter value of a counter based on a result of detecting pixels having a pixel value that is less than a predetermined threshold value between the correction line and the precedent line, so as to detect the number of linked dots that are linked from a side of the correction line to the bottom-end edge in the sub scanning direction, and the bottom-end edge is an edge at which the density becomes lower in the sub scanning direction and the lower of density values represents the background color.

* * * * *